US 6,598,041 B1

(12) United States Patent
Bernal et al.

(10) Patent No.: US 6,598,041 B1
(45) Date of Patent: Jul. 22, 2003

(54) METHOD, SYSTEM, AND PROGRAM FOR PROCESSING MODIFICATIONS TO DATA IN TABLES IN A DATABASE SYSTEM

(75) Inventors: Margaret Ann Bernal, San Jose, CA (US); Christopher John Crone, San Jose, CA (US); Paramesh Desai, San Jose, CA (US); Georgia Carroll Fuller, San Jose, CA (US); Peter Hoa, Los Altos, CA (US); Eric Naoto Katayama, San Jose, CA (US); William Y. Kyu, San Jose, CA (US); Kalpana Shyam, Los Altos, CA (US); Julie Ann Watts, Morgan Hills, CA (US); Jennifer Wha-Yuh Ou, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 09/656,558

(22) Filed: Sep. 7, 2000

(51) Int. Cl.[7] ............................................... G06F 17/30
(52) U.S. Cl. ................................................ 707/3; 707/1
(58) Field of Search ................................ 707/1, 2, 3, 4, 707/7, 8, 10, 100, 101, 102, 533; 717/114; 345/467, 160, 784, 787; 365/15; 358/1.1; 29/603.14

(56) References Cited

U.S. PATENT DOCUMENTS

| | | | |
|---|---|---|---|
| 4,190,835 A | 2/1980 | Buynak | 345/467 |
| 4,221,003 A | 9/1980 | Chang et al. | 365/15 |
| 4,434,475 A | 2/1984 | McCaskill et al. | 345/160 |
| 5,097,408 A | 3/1992 | Huber | 707/4 |
| 5,241,648 A | 8/1993 | Cheng et al. | 707/533 |
| 5,276,870 A | 1/1994 | Shan et al. | 707/2 |
| 5,396,623 A | 3/1995 | McCall et al. | 707/101 |

(List continued on next page.)

FOREIGN PATENT DOCUMENTS

| | | |
|---|---|---|
| JP | 63071741 | 4/1988 |
| JP | 1009546 | 1/1989 |
| JP | 5225250 | 9/1993 |
| WO | WO9857279 | 12/1998 |
| WO | WO9927679 | 6/1999 |

OTHER PUBLICATIONS

Preliminary Amendment submitted in Application Ser. No. 09/915,869, filed on Jul. 26, 2001.
Preliminary Amendment submitted in Application Ser. No. 09/915,866, filed on Jul. 26, 2001.
Preliminary Amendment submitted in Application Ser. No. 09/915,868, filed on Jul. 26, 2001.
Preliminary Amendment submitted in Application Ser. No. 09/915,783, filed on Jul. 26, 2001.
Preliminary Amendment submitted in Application Ser. No. 09/915,867, filed on Jul. 26, 2001.
U.S. patent application Ser. No. 09/365,953, filed on Aug. 8, 1999, entitled, "Automatic Pruning For Log–Based Replication", invented by IT leong and PL Shimer.

(List continued on next page.)

*Primary Examiner*—Diane D. Mizrahi
*Assistant Examiner*—Yicun Wu
(74) *Attorney, Agent, or Firm*—David W. Victor; Konrad Raynes Victor & Mann LLP

(57) ABSTRACT

Provided is a method, system, program, and data structures for making data available to an application program. A result table is generated including rows corresponding to a subset of rows in a base table having data in one or more columns that satisfy a query predicate clause. The result table includes, for each row, a location identifier of the corresponding row in the base table and a column for each column in a query select list. The result table is accessed to return requested data from the base table to the application program.

75 Claims, 13 Drawing Sheets

U.S. PATENT DOCUMENTS

| | | | |
|---|---|---|---|
| 5,410,693 A | 4/1995 | Yu et al. | 707/100 |
| 5,412,805 A | 5/1995 | Jordan, II et al. | 707/101 |
| 5,446,858 A | 8/1995 | Copeland et al. | 707/8 |
| 5,450,581 A | 9/1995 | Bergen et al. | 707/101 |
| 5,546,576 A | 8/1996 | Cochrane et al. | 707/2 |
| 5,579,515 A | 11/1996 | Hintz et al. | 707/7 |
| 5,581,275 A | 12/1996 | Glei et al. | 345/784 |
| 5,590,319 A | 12/1996 | Cohen et al. | 707/4 |
| 5,724,575 A | 3/1998 | Hoover et al. | 707/10 |
| 5,739,817 A | 4/1998 | Glei et al. | 345/787 |
| 5,742,806 A | 4/1998 | Reiner et al. | 707/3 |
| 5,758,357 A | 5/1998 | Barry et al. | 707/101 |
| 5,819,268 A | 10/1998 | Hackett | 707/3 |
| 5,826,253 A * | 10/1998 | Bredenberg | 707/1 |
| 5,835,904 A * | 11/1998 | Vicik et al. | 707/1 |
| 5,887,274 A | 3/1999 | Barry et al. | 707/101 |
| 5,930,795 A | 7/1999 | Chen et al. | 358/1.1 |
| 5,963,936 A | 10/1999 | Cochrane et al. | 707/2 |
| 5,974,407 A | 10/1999 | Sacks | 707/1 |
| 5,987,472 A | 11/1999 | Serafin | 707/102 |
| 6,044,216 A * | 3/2000 | Bhargava et al. | 717/114 |
| 6,092,062 A | 7/2000 | Lohman et al. | 707/2 |
| 6,212,514 B1 | 4/2001 | Eberhard et al. | 707/2 |
| 6,223,420 B1 | 5/2001 | Lee et al. | 29/603.14 |
| 6,339,772 B1 * | 1/2002 | Klein et al. | 707/3 |

OTHER PUBLICATIONS

U.S. patent application Ser. No. 09/325,661, filed on Jun. 2, 1999, Prov filed Oct. 8, 1998, entitled, "Database Extender For Storing, Querying, and Retrieving Structured Documents", invented by DT Chang; JH Chow; J Xu; and JM Cheng.

U.S. patent application Ser. No. 09/324,499, filed on Jun. 2, 1999, Prov filed Oct. 8, 1998, entitled, "Method and Apparatus For Indexing Structured Documents With Rich Data Types", invented by YC Fuh; JH Chow; J Xu; and JM Cheng.

U.S. patent application Ser. No. 09/324,827, filed on Jun. 2, 1999, Prov filed Oct. 8, 1998, entitled, "Method and Apparatus For Querying Structured Documents Using A Database Extender", invented by JH Chow; J Xu; and JM Cheng.

U.S. patent application Ser. No. 09/466,862, filed on Dec. 17, 1999, entitled, "Support For Summary Tables In A Heterogeneous Database Environment", invented by RJ Cochrane; JC Kleewein; TY Leung; MH Pirahesh; N. Subramanian; and S. Venkataraman.

IBM, Corp., "New Options for FETCH in SQL", Technical Disclosure Bulletin, vol. 36, No. 06A, Jun. 1993, pp. 559–560.

IBM, Corp., "Dynamic Ordering of Joined Rows using Fields from MultipleTables", Technical Disclosure Bulletin, vol. 36, No. 11, Nov. 1993, pp. 363–366.

IBM, Corp., "Orderable, Updatable, Scrollable Structured Query Language Cursors", Technical Disclosure Bulletin, vol. 38, No. 07, Jul. 1995, pp. 393–394.

IBM, Corp., "Updateable Scrollable Cursors", Technical Disclosure Bulletin, vol. 36, No. 04, Apr. 1993, pp. 263–268.

IBM, Corp., "Technique to Allow DB2 Utilities and Commands to Run While SQL Applications have a Table Space Locked", Technical Disclosure Bulletin, vol. 36, No. 09A, Sep. 1993, pp. 499–502.

IBM, Corp., "Administration Guide: Performance" Version 6 from IBM DB2 Universal Database, Reference SC09–2840–00, 1999, pp. 219–226.

Microsoft Corp., "Forward–only Cursors" [online], 2000, pp. 1–3. [Retrieved on Jun. 24, 2000]. Retrieved from the Internet at <URL: http://msdn.microsoft.com/library/psdk/sql/8_con_07_10.htm>.

Microsoft Corp., "Types of Cursors" [online], 2000, pp. 1–3. [Retrieved on Jun. 24, 2000]. Retrieved from the Internet at <URL: http://msdn.microsoft.com/library/partbook/vb6/typesofcursors.htm.>.

Microsoft Corp., "Controlling Cursor Behavior" [online], 2000, pp. 1. [Retrieved on Jun. 24, 2000]. Retrieved from the Internet at <URL: http://msdn.microsoft.com/library/psdk/sql/8 con 07 8.htm.>.

Microsoft Corp., "MDAC 2.5 SDK–ODBC Programmer's Reference Chapter 3: ODBC Architecture" [online], 2000, pp. 1–2. [Retrieved on Jun. 24, 2000] Retrieved from the Internet at <URL:http://msdn.microsoft.com/library/psdk/dasdk/odch6gh1.htm.>.

Microsoft Corp., "MDAC 2.5 SDK–ODBC Programmer's Reference Chapter 17: Programming Considerations" [online], 2000, pp. 1–6. [Retrieved on Jun. 24, 2000] Retrieved from the Internet at <URL:http://msdn.microsoft.com/library/psdk/dasdk/odch8goj.htm.>.

Microsoft Corp., "Dynamic Cursors" [online], 2000, pp. 1. [Retrieved on Jun. 24, 2000]. Retrieved from the Internet at <URL: http://msdn.microsoft.com/library/psdk/sql/8_con_07_14.htm>.

Microsoft Corp., "Static Cursors" [online], 2000, pp. 1. [Retrieved on Jun. 24, 2000]. Retrieved from the Internet at <URL: http://msdn.microsoft.com/library/psdk/sql/8_con_07_12.htm>.

Microsoft Corp., "Cursor Types" [online], 2000, pp. 1. [Retrieved on Jun. 24, 2000]. Retrieved from the Internet at <URL: http://msdn.microsoft.com/library/psdk/sql/8_con_07_9.htm>.

Microsoft Corp., "What the Heck is a Cursor, Anyway?" [online], 2000, pp. 1–3. [Retrieved on Jun. 24, 2000]. Retrieved from the Internet at <URL: http://msdn.microsoft-.com/library/partbook/vb6/whatheckiscursoranyway.htm>.

Microsoft Corp., "Fetching and Scrolling" [online], 2000, pp. 1–2. [Retrieved on Jun. 24, 2000}. Retrieved on the Internet at <URL: http://msdn.microsoft.com/library/psdk/sql/8_con_07_7.htm>.

Microsoft Corp., "Changing Rows with Positioned Operations" [online], 2000, pp. 1–2. [Retrieved Jun. 24, 2000}. Retrieved from the Internet at <URL: http://msdn.microsoft-.com/library/psdk/sql/8_con_07_22.htm>.

Microsoft Corp., "Cursors" [online], 2000, pp. 1. [Retrieved on Jun. 24, 2000]. Retrieved on the Internet at <URL: http://msdn.microsoft.com/library/psdk/sql/8_con_07.htm>.

Microsoft Corp., "Cursor Locking" [online], 2000, pp. 1. [Retrieved on Jun. 24, 2000]. Retrieved on the Internet at <URL: http://msdn.microsoft.com/library/psdk/sql/8_con_07_18.htm>.

Microsoft Corp., "Scrollable Cursors" [online], 2000, pp. 1. [Retrieved on Jun. 24, 2000]. Retrieved on the Internet at <URL: http://msdn.microsoft.com/library/devprods/vs6/vstudio/vsentpro/veconscrollablecursors.htm>.

Microsoft Corp., "Block Cursors, Scrollable Cursors, and Backward Compatibility for ODBC 3.x Applications" [online], 2000, pp. 1–3. [Retrieved on Jun. 24, 2000]. Retrieved from the Internet at <URL: http://msdn.microsoft.com/library/psdk/dasdk/odch8goj.htm>.

Microsoft Corp., "Using Block and Scrollable Cursors" [online], from ADABAS D ODBC Reference, no date listed, pp. <URL: http://cs1.mcm.edu/tutorial/doc/Adabas/odbc/odbc41.htm>.

* cited by examiner

METHOD, SYSTEM, AND PROGRAM FOR PROCESSING MODIFICATIONS TO DATA IN TABLES IN A DATABASE SYSTEM

BACKGROUND OF THE INVENTION

1. Field of the Invention

The present invention relates to a method, system, and program for implementing cursors in a database and, in particular, updateable scrollable cursors.

2. Description of the Related Art

Prior art database programs include a feature referred to as cursors. A cursor is a named control structure used by an application program to point to a row of interest within some set of rows and to retrieve rows from the set, possibly making updates and deletions. A cursor points to rows from a database table that satisfy a structured query language (SQL) query against the table. The rows in the table that satisfy the SQL query comprise a result table of data. The SQL query includes an SQL SELECT statement and a WHERE clause to qualify rows according to a predicate. An application can then access data on a row-by-row basis from the result table.

If the result table is static and not updateable, then the result table may be materialized in a workfile. Alternatively, the cursor may point directly to the rows in the base table. In such case, the result table is not materialized in a workfile and the cursor is updateable when the base table is updated.

When a cursor is opened or initialized, the current row position of the cursor is the first record in the result table. The application program may then issue fetch commands to move the current row position and fetch forward or backward by one or more rows or from the first or last row by one or more rows. In current implementations, if the cursor is static, then the result table cannot be updated such that once it is created no rows will be added or removed, and no values in any rows will change. Further, a static cursor is not affected by other applications accessing or updating the data records in the underlying database table from which the result set was generated. Still further, in current static cursor implementations, the cursor is also read-only so that it is not possible for the application to change any values in the cursor result table.

Open DataBase Connectivity (ODBC) is a standard database access method to allow applications to access data in a database management system (DBMS). An ODBC driver translates the application's queries into commands that the DBMS understands. The ODBC standards describe scrollable, keyset driven, static and dynamic cursors. The ODBC standards mention that cursors may be updateable or nonupdateable. Cursors are defined as updateable if the application is capable of modifying the data in the cursor result table. As discussed, the result table may be implemented in a work file or comprise the rows pointed to by the cursor in the base table. The ODBC also mentions that when positioned on a row in an updateable cursor, the application can perform position updates or delete operations that target the base table rows used to build the current row in the cursor.

The ODBC defines the following types of cursors:

scrollable cursor: allows the application to fetch forward or backward from the current position, i.e., from anywhere, in the result set. With a scrollable cursor, your application can request by position the data presented in the current row. Typical scrolling requests include moving one row forward, one row back, to the beginning, or to the end of the result set. With a scrollable cursor, the application can request that a certain row of data be made the current row more than once.

forward-only cursor: allows the application to fetch forward serially from the start to end of the result set.

keyset cursor: the rows in the result table are identified by the value present in a designated column.

static cursors only contain data that was placed in the cursor when it was created.

A static cursor does not display new rows inserted in the database after the cursor was opened, even if they match the search conditions of the cursor SELECT statement. If rows in the result table are updated by means other than through the cursor defining the result table, then the new data values are not displayed in the static cursor. The static cursor may display rows deleted from the database after the cursor was opened if they were deleted by a positioned delete through the cursor.

dynamic cursors: Dynamic cursors reflect all changes made to the rows in their result table when scrolling through the cursor. The data values, order, and membership of the rows in the result table can change on each fetch. All UPDATE, INSERT, and DELETE statements made by all users are visible through the cursor. Updates are visible immediately if they are made through the cursor. Updates made outside the cursor are not visible until they are committed, unless the cursor transaction isolation level is set to read uncommitted. Updates made outside the cursor by the same transaction as that which defines the cursor are immediately visible.

Cursors may be categorized as forward-only or scrollable. If the cursor is scrollable then they can be either static, keyset or dynamic.

Although the ODBC defines the above types of scrollable and updateable cursors, such cursor features are not typically implemented in database programs. Thus, there is a need in the art to provide an implementation of scrollable cursors in a DBMS.

SUMMARY OF THE PREFERRED EMBODIMENTS

To address the shortcomings in the prior art discussed above, preferred embodiments disclose a method, system, program, and data structures for making data available to an application program. A result table is generated including rows corresponding to a subset of rows in a base table having data in one or more columns that satisfy a query predicate clause. The result table includes, for each row, a location identifier of the corresponding row in the base table and a column for each column in a query select list. The result table is accessed to return requested data from the base table to the application program.

In further embodiments, the query select list is provided from a structured language query (SQL) SELECT statement and the query predicate clause is provided from an SQL WHERE statement.

Still further, the result table may comprise a database table.

In additional embodiments, a database INSERT command is generated to insert data from columns in base table rows that satisfy the query predicate clause into corresponding columns in result table rows. In such case, an insert list is generated including an entry for each column in the query select list. An insert statement is generated to insert data from the base table columns listed in the query select list into the corresponding result table columns in the insert list. The query predicate clause is generated into the insert statement. The insert statement is then executed to insert data from the base table columns in the query select list into the corresponding result table columns in the insert list. In this way, data is inserted from those base table rows having data that satisfies the query predicate clause in the insert statement.

Preferred embodiments provide a technique for implementing a result table and, in particular, for result tables used with static scrollable cursors. Preferred embodiments include control information with the result table and control blocks used to form the result table that allow for an implementation of static scrollable cursors where the result table is sensitive to changes in the base table and where updates to the result table entries are reflected in the base table.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
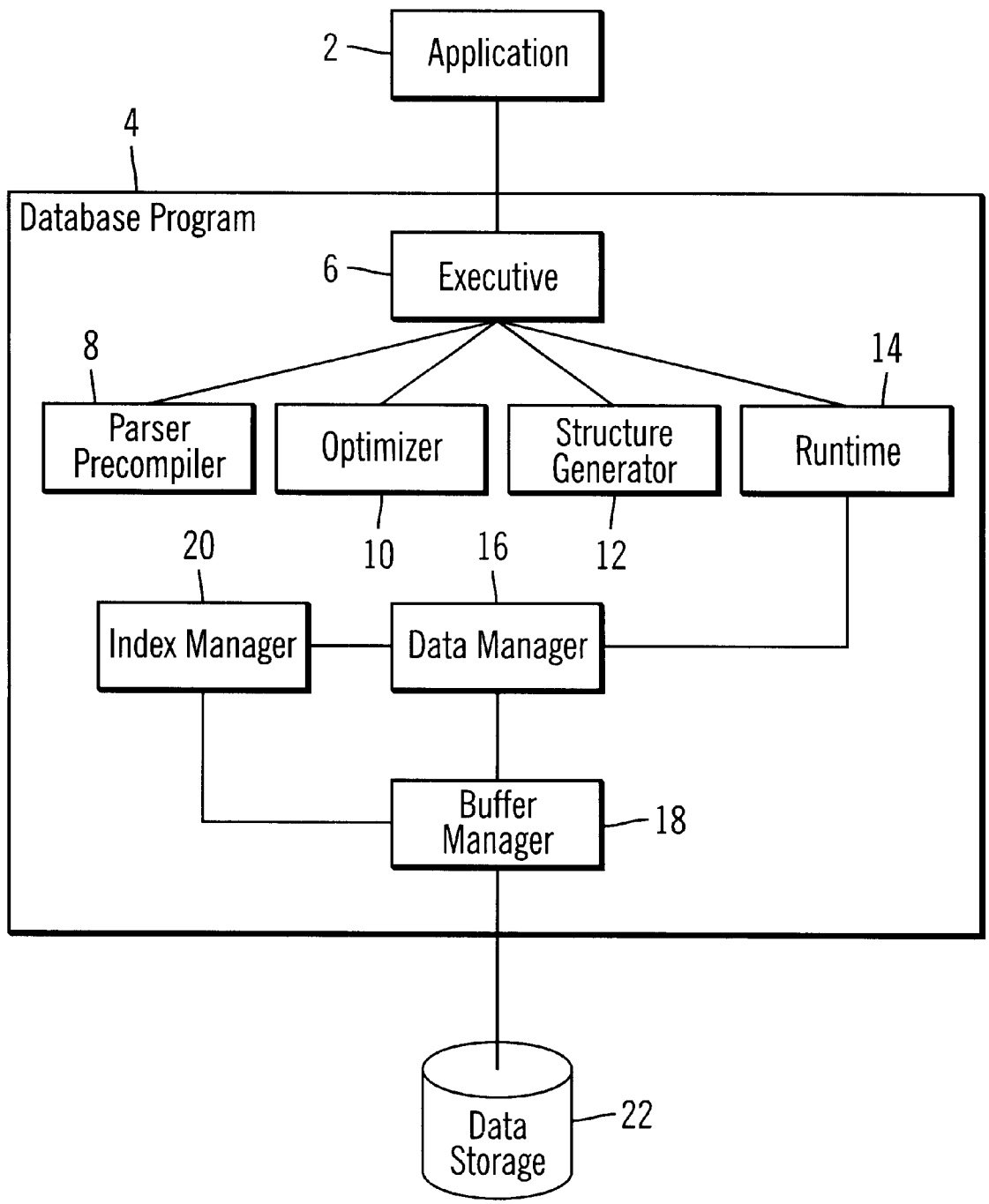
FIG. 1 illustrates a computing environment in which preferred embodiments are implemented.

FIG. 1 illustrates a computing environment in which preferred embodiments are implemented. An application program 2 provides an SQL query or cursor related commands to a database program 4. The database program includes the following program components: an executive program 6, a parser precompiler 8, an optimizer 10, a structure generator 12, a runtime program 14, a data manager 16, a buffer manager 18 and an index manager 20. The components of the database program 4 interpret the SQL and cursor related statements from the application 2 and retrieve data from database tables stored in data storage 22 or computer memory. The data storage 22 may comprise an array of interlinked disk drives, otherwise known as a Direct Access Storage Device (DASD), or any other data storage device known in the art, e.g., tape drives, optical disks, RAID array, etc.

The executive program 6 initially receives the database statements from the application 2. Upon detecting that the commands from the application 2 is an SQL query or cursor related command, the executive program 6 would call the parser precompiler 8 to parse the statements from the application program 2 and generate parse trees for the statements in a manner known in the art. The parser precompiler 8 would return the parsed statements to the executive 6. The executive program 6 would then call the optimizer program 10 to optimize the parse trees in a manner known in the art and return the optimized parse trees to the executive 6. The executive 6 would then call the structure generator 12 program to generate the control blocks and related data structures to implement the cursors in accordance with the preferred embodiments. The structure generator 12 receives as input the optimized parsed trees of the statements to build the runtime structure.

After the structure generator 12 creates the control blocks and data structures needed to implement the scrollable cursors, the executive 6 then calls the runtime program 14. The runtime program 14 calls the data manager 16 and issues commands to the data manager 16 to retrieve the requested data. Thus, the runtime program 14 instructs the data manager 16 on how to execute the query. The data manager 16 then determines the pages in the database that include the table that is subject to the query and calls the buffer manager 18 to access the pages in the table. The buffer manager 18 then accesses pages from the data storage 22. The data manager 16 would then determine which rows in the returned pages satisfy the query and return those qualifying rows to the runtime program 14. Further, the data manager 16 would also perform any updates or modifications to rows in the database tables. If the query is made against a database index as opposed to a table, then the data manager 16 would call the index manager 20 to manage the operation and request pages for the index.

Figure 2:
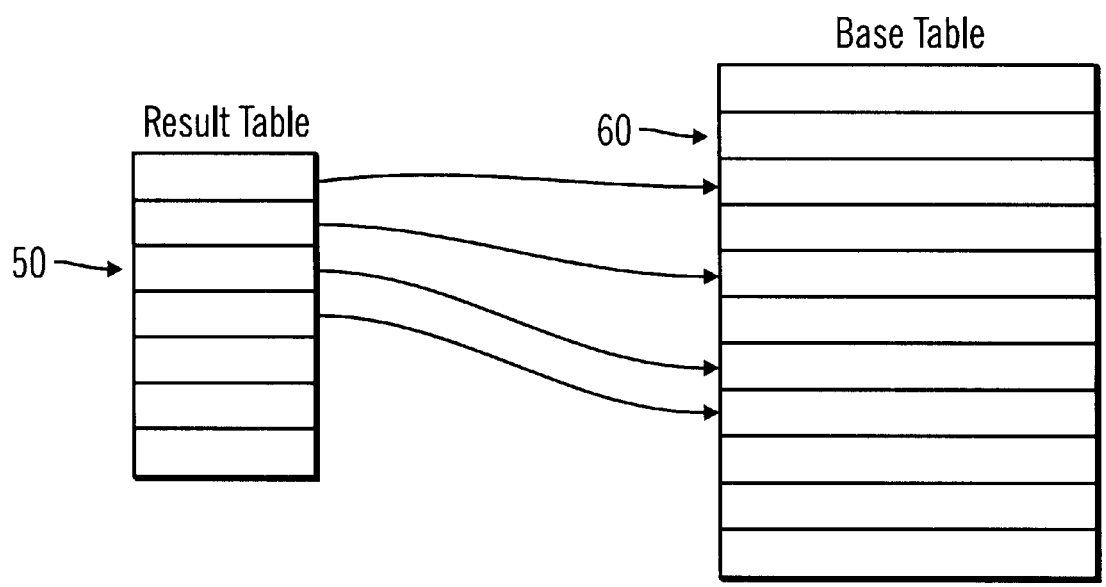
FIG. 2 illustrates a relationship between rows in a cursor result table and an underlying database table, referred to as the base table in accordance with preferred embodiments of the present invention.

FIG. 2 illustrates how rows in a cursor result 50 table correspond to rows in a database table 60. As discussed, the declaration of the cursor would provide a SELECT statement specifying columns of the database table 60 and a WHERE clause including one or more predicates to qualify rows of the database table 60. The data manager 16 would return to the cursor the selected columns in the select list from rows that satisfy the WHERE statement. If the select list includes an expression comprising an operation involving one or more columns, then the data manager 16 would further return the result of such operation. The data manager 16 would also populate the result table 50 with the returned results. In preferred static cursor embodiments, the result table 50 is implemented as a standard database table, as opposed to a temporary workfile.

Figure 3:
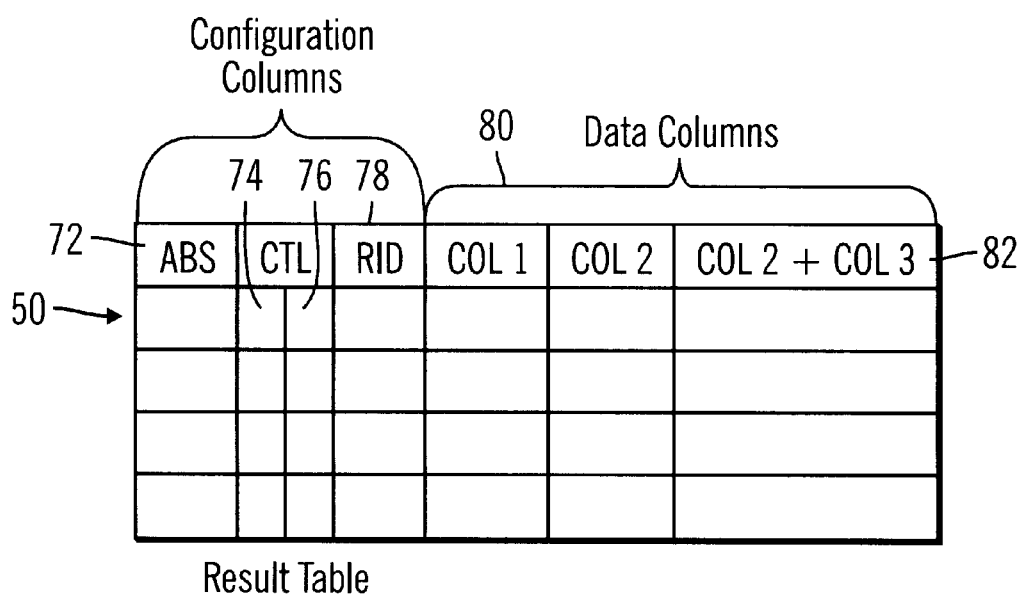
FIG. 3 illustrates an arrangement of a cursor result table in accordance with preferred embodiments of the present invention.

In preferred embodiments, the result table 50 includes the columns shown in FIG. 3. The result table 50 has configuration columns and data columns. The configuration columns include an absolute (ABS) column 72 that lists the absolute row number in the result table 50. A RID column 78 including a record ID, which is a number that uniquely identifies a record in a table, such as the database table 60 and contains enough information to address the page on which it is stored. The RID includes a page number of the page including the record in a tablespace and a unique identifier of the record in the page. The page number plus the unique identifier identifies the record in the tablespace. A table is comprised of multiple records (rows). In storage, the records are stored in pages, which are part of segments included in a tablespace. The result table 50 further includes control flags (CTL) 74 and 76. Control flag 74 is a one bit "delete flag" indicating whether the row in the database table 60 corresponding to the current row in the result table 50 was deleted. Control flag 76 is a one bit "update flag" indicating whether the corresponding row in the database table 60 no longer qualifies according to the predicate in the WHERE clause of the SELECT statement provided with the declaration of the cursor.

The data columns in the result table 80, which are shown as COL 1, COL 2 and COL 2+COL 3, would have been listed in the select list of the SELECT statement provided with the declaration of the cursor, i.e., the data the columns from the database table 60 the application 2 selected to include in the result table 50. The column 82 is an expression column in that it is the result of an operation performed on one or more of the select columns. FIG. 3 is intended only for illustration of possible data columns and any number of columns and operation columns may be included in the SELECT statement to use to populate the result table 50.

Figure 4:
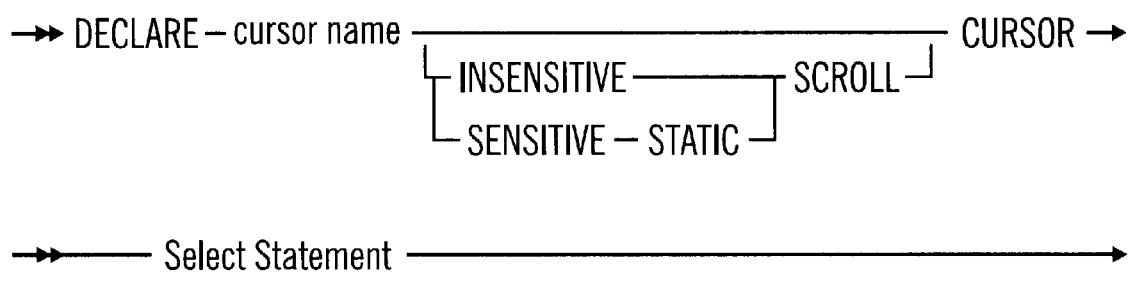
FIG. 4 illustrates the format of a DECLARE cursor command in accordance with preferred embodiments of the present invention.

The application 2 would initialize a cursor using a declare cursor command. FIG. 4 illustrates a format of a DECLARE cursor command in accordance with the preferred embodiments. To declare a scrollable cursor, the application 2 must specify either "insensitive" or "sensitive static". If "insensitive" is specified, then changes to the database table from which the cursor result table is derived will not be visible to the cursor. Instead, the cursor only provides a read-only view of the contents of the result table or result table. Moreover, a cursor defined as "insensitive" cannot be used for positioned updates or deletes because the cursor is not intended to interact with the base table to ensure data consistency for any positioned updates or deletes to rows in the base table.

A static cursor specified as "sensitive" indicates that changes made to the underlying base table 60 are provided to the cursor when fetching rows from the result table. When the database program 4 processes a sensitive static fetch, then the fetched rows are retrieved from the underlying database table 60, where the predicates in the row in the base table are evaluated to determine whether the base table 60 row satisfies the WHERE criteria in the SELECT command. Alternatively, predicate fields may be stored and a verification may be made as to whether the fields have changed. If so, the row in the underlying base table 60 is updated to the result table 50. The "select statement" path in the DECLARE command in FIG. 4 provides the select criteria on the database table 60 and may include a WHERE clause with predicates and operations on the selected columns.

A cursor specified as "scroll" can move backward and forward through the result table. A scrollable cursor may also be declared either "insensitive" or "sensitive static". In preferred embodiments, a cursor may have the following declarations with the following results:

Scroll not Specified, read only: The result table 50 is a fixed work file, not a database table. Updates cannot be made to the result table 50 and updates to the underlying records in the base table 60 cannot be viewed through the cursor.

Insensitive Scroll: The result table 50 comprises a database table, and updates to the result table 50 cannot be made nor are updates to the underlying base table 60 observable through the cursor.

Sensitive Static Scroll: The result table 50 is a database table. Updates can be made to the result table 50 and updates to the underlying base table 60 are visible to the cursor when fetching rows in the result table. Updates to the result table 50 are reflected in the base table 60.

To generate the result table 50, the database program 4, and the structure generator 12 in particular, must set-up data structures and control blocks defining the columns in the result table 50. The control blocks for each result table column 50 would include the following fields:

"bcol#": indicates the corresponding column in the base table 60. A value of 0 indicates that there is no corresponding column in the base table 60 for the result table column 50.

"dtt": is used for the configuration columns to indicate that the result table 40 is a temporary database table.

"cmp": a value of "1" indicates that the column in the result table 50 is compared with a corresponding column in the base table 60 when performing certain cursor operations, such as FETCH, UPDATE, DELETE, etc. A value of "0" indicates that the result table 50 column is not compared to the corresponding base table 60 column during cursor operations.

"type": indicates the type of column, e.g., ABS, CTL, RID. "OUT" indicates the column corresponds to columns from the base table 60 or is an expression based on base table 60 columns.

"only": a value of "1" indicates that the column is only in the result table 50 and not available to the cursor and "0" indicates that the column is available to the cursor. For instance, columns used in expression columns but not listed in the select list of the SELECT statement have a value of "1" as they are found in the result table 50 but not part of the columns accessible to cursor operations.

Figure 5:
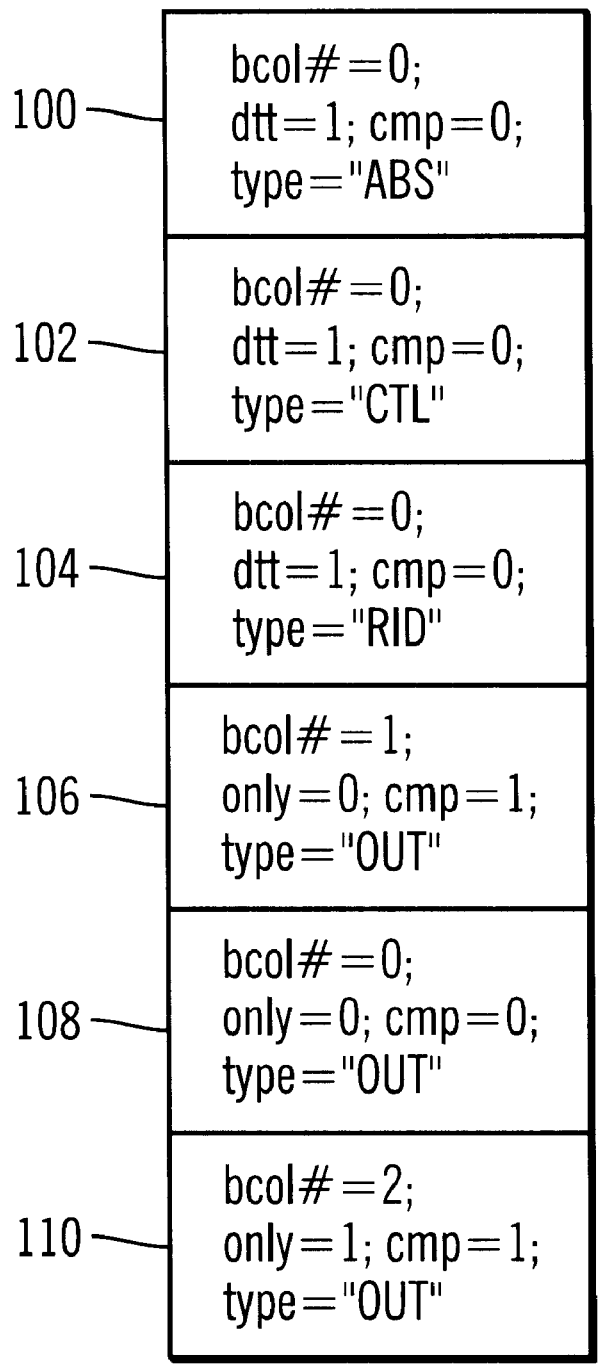
FIG. 5 illustrates an arrangement of control blocks defining the cursor result table columns in accordance with preferred embodiments of the present invention.

FIG. 5 illustrates an example of the control blocks that the structure generator 12 would create for each column in the result table 50 for a SELECT statement of SELECT C1, C1+C2. The control blocks 100, 102, and 104 for ABS, RID, and CTL, respectively, have a "cmp" of "0", indicating that the result table 50 configuration columns are not involved in comparison checking with the base table 60. The control block 106 is for the selected column C1 in the result table 50 and has a "bcol#" value of "1", indicating that this result table 50 column corresponds to column 1 in the base table 60; a "cmp" block of "1" indicating that this result column is checked against the corresponding base table 60 column to determine if the base table value has been updated; and an "only" value of "0" indicating that the column is available to the cursor. The control block 108 for the expression column of C1+C2 has a "bcol" value of "0" indicating there is no direct corresponding column in the base table 60; a "cmp" of 0 indicating that this result table 50 is not checked; and an "only" value of "0" indicating that the column is available to the cursor. The control block 110 provides information for the base table 60 column C2 that is part of an expression column for C1+C2, which is not separately included in the select list. Although the column C2 is not in the select list, this column is still maintained in the result table because it is used in the expression column C1+C2 and is checked for changes.

Figure 6:
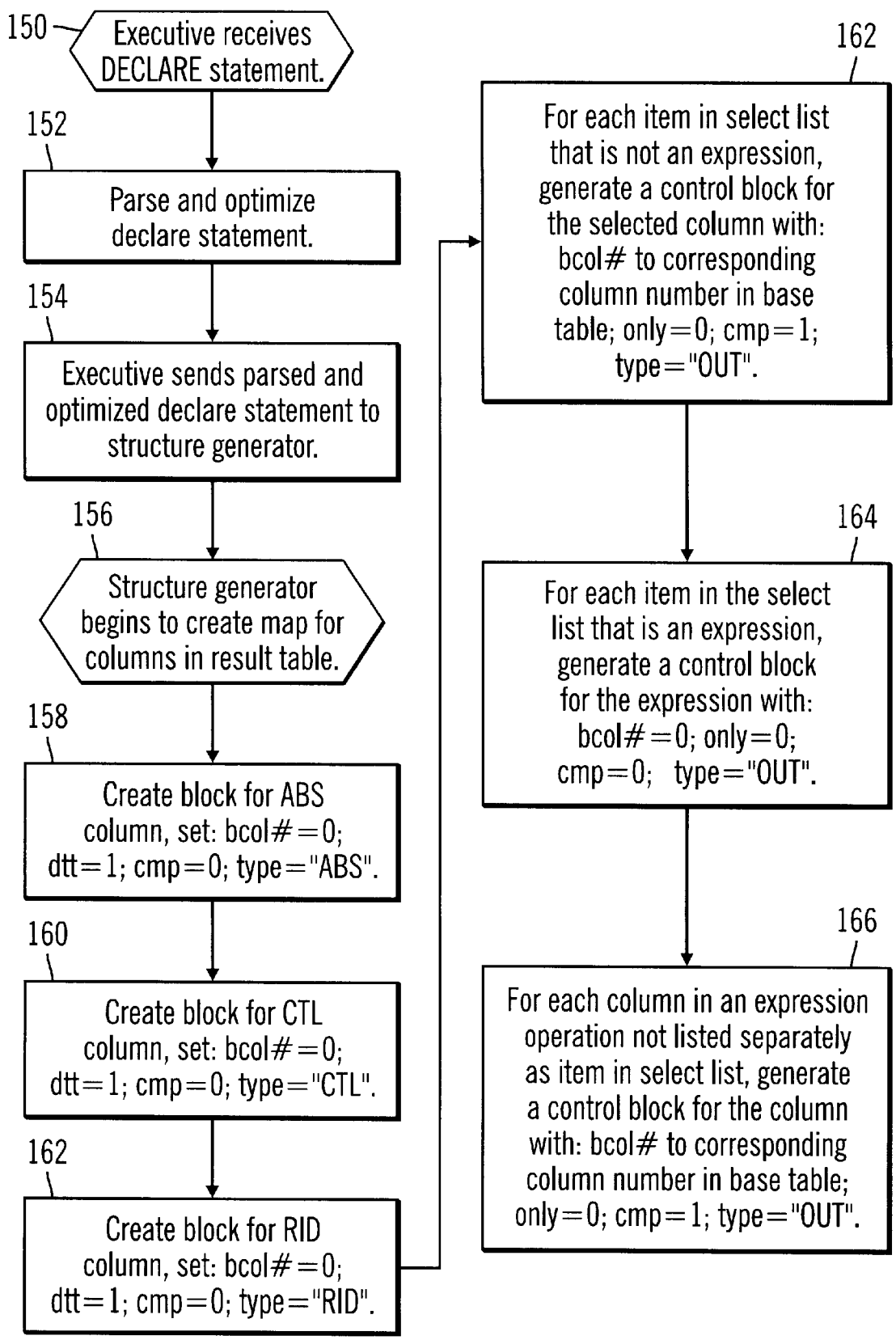
FIG. 6 illustrates logic implemented in the database program to execute a DECLARE cursor command in accordance with preferred embodiments of the present invention.

FIG. 6 illustrates logic implemented in the database program 4 components to setup the control blocks defining the column in the result table 50, such as the control blocks 100–110 shown in FIG. 5. Control begins at block 150 with the executive 6 receiving a DECLARE statement from the application 2 to create a STATIC SENSITIVE cursor. The executive 6 (at block 152) passes the DECLARE statement to the parser precompiler 8 and optimizer 10 to have the statement parsed and optimize. The executive 6 then sends (at block 154) the parsed and optimized DECLARE statement to the structure generator 12 to generate the control blocks to define the columns in the result table 50. Upon receiving (at block 156) the parsed DECLARE statement, the structure generator 12 generates: at block 158, a control block for the absolute (ABS) column and sets "bcol#" to 0, "dtt" to 1, "cmp" to 0, and "type" to "ABS"; at block 160 a control block for the absolute control (CTL) column and sets "bcol#" to 0, "dtt" to 1, "cmp" to 0, and "type" to "CTL"; and at block 162 a control block for the RID column (RID) and sets "bcol#" to 0, "dtt" to 1, "cmp" to 0, and "type" to "RID".

For each selected column in the select list of the SELECT statement, the structure generator 12 generates (at block 162) a control block for the item in the select list and sets "bcol#" to the corresponding column in the base table 60, "only" to 0, "cmp" to 1, and "type" to "OUT". For each expression defining an operation on one or more columns in the base table 60 in the select list, the structure generator 12 generates (at block 164) a control block for the expression in the select list and sets "bcol#" to 0 as there is no corresponding column in the base table 60, "only" to 0, "cmp" to 0, and "type" to "OUT". For each base table column included in an expression in the SELECT statement that is also not listed as a selected column in the SELECT statement, the structure generator 12 generates (at block 166) a control block for the base table column and sets "bcol#" to the corresponding column in the base table 60, "only" to 1 indicating that the base table column is used in an expression but not available to the cursor in the result table 50, "cmp" to 1, and "type" to "OUT". Thus, base table columns included in expressions in the select list of SELECT statement that are not specifically selected columns are compared when fetching rows from the result table to ensure that all base table columns involved in expressions in the SELECT statement are checked to determine if the base table value has been updated.

After the DECLARE statement is processed and the control blocks defining the structure of the result table 50 are generated, the executive 6 may then receive an OPEN statement from the application 2 to open the cursor and populate the result table 50 with those rows in the base table 60 that satisfy the predicate requirements provided with the WHERE clause in the SELECT statement. Alternatively, during a "slow materialization", rows may be added to the result table 50 as needed.

Figure 7:
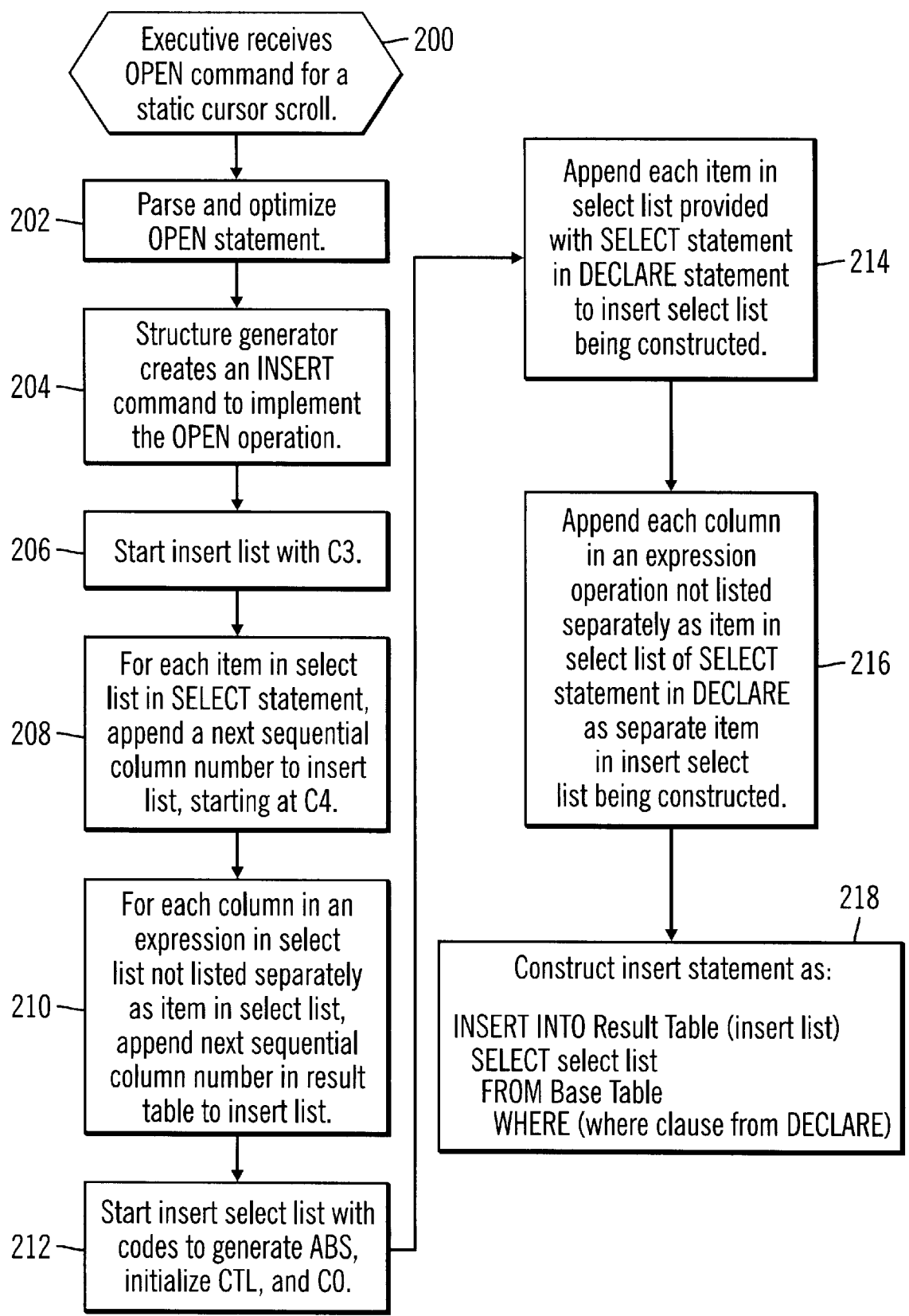
FIG. 7 illustrates logic implemented in the database program to execute an OPEN cursor command to populate the cursor result table in accordance with preferred embodiments of the present invention.

FIG. 7 illustrates logic implemented in the components of the database program 4 to convert the DECLARE statement into a common database INSERT command to populate the rows of the result table 50 with rows from the base table 60 that satisfy the WHERE statement predicates. Control begins at block 200 with the executive 6 receiving an OPEN command for a static cursor scroll. The DECLARE statement for the static scrollable cursor would have been previously processed. The executive 6 then calls (at block 202) the parser compiler 8 and optimizer 10 to parse and optimize the OPEN statement. After the OPEN statement is parsed and optimized, the executive 6 calls (at block 204) the structure generator 12 to construct an INSERT command from the SELECT statement in the previously compiled and executed DECLARE statement to populate the rows of the result table 50 with the qualifying rows of the base table 60.

The structure generator 12 begins the process of constructing the INSERT command by generating an insert list of the columns in the result table 50 into which the data from the base table 60 is inserted. The first entry placed (at block 206) in the insert list is C3 (column 3), as this is the column in the result table into which the RID will be inserted. The structure generator 12 then appends (at block 208) a series of sequential column numbers starting at C4 to the insert list, where there is one column number for each item (either selected column or expression) in the select list of the SELECT statement provided with the DECLARE statement. For each column in an expression in the insert list that is not separately listed as a selected column in the select list, the structure generator 12 appends (at block 210) a series of sequential column numbers to the insert list, where there is one column number for each expression column not separately listed as a selected column.

An insert select list is started (at block 212) for the SELECT substatement of the INSERT statement begins with a code to insert the ABS value for the row, initialize the CTL flags, and column 0 (C0) to obtain the RID. In preferred embodiments, the data manager 16 is programmed to return the RID for a row in response to receiving a request for data from column 0. In this way, the runtime 14 can instruct the data manager 16 to return the RID by requesting data for column 0 for a row.

The structure generator 12 then appends (at block 214) each item in the insert select list provided with the SELECT substatement in the DECLARE statement to the insert select list being constructed. Each base table 60 column used an expression operation in the select list in the SELECT substatement not separately listed in the select list is appended (at block 216) to the insert select list. The structure generator 12 then generates (at block 218) an INSERT command using the constructed insert list and insert select list of the form:

INSERT INTO Result Table (insert list)
   SELECT insert select list
     FROM Base Table
     WHERE (use WHERE clause included in the DECLARE CURSOR select statement)

For example, if the SELECT statement comprised:
SELECT C1, C2, C1+C2+C3,
WHERE C4>5, then the resulting INSERT command would be as follows:

```
INSERT INTO Result Table (ABS, CTL, C0, C1, C2,
   SUM, C3)
   SELECT C0, C1, C2, C1+C2+C3
      FROM Base Table
         WHERE C4>5.
```

In the above example, the parameters in the INSERT INTO statement are the values that are inserted into the result table 50 from the base table. For instance, ABS, or the number value of the cursor entry, is inserted into the first column of the result table 50; an initialized value for the CTL flag is entered into the second column; the RID, which is returned in response to a request for column 0 (C0), is inserted in the third column; column 1 (C1) and column 2 (C2) of the base table 60 is inserted in the fourth and fifth columns, respectively; the SUM of C1+C2+C3, which comprises an expression, of the base table 60 is inserted in the sixth column; and column 3 (C3) is inserted in the seventh column. The cursor implements the above INSERT statement internally to populate the result table 50. The SELECT statement indicates those columns that are selected from the base table 60.

After constructing the INSERT command for internal use by the cursor, the executive 6 passes the INSERT command to the runtime program 14 to call the data manager 16 to gather the requested data from the base table 60 to insert into the columns of the result table 50. In this way, a standard database INSERT command known in the art is constructed to implement the OPEN operation and construct the result table 50 of the preferred embodiments.

Figure 8:
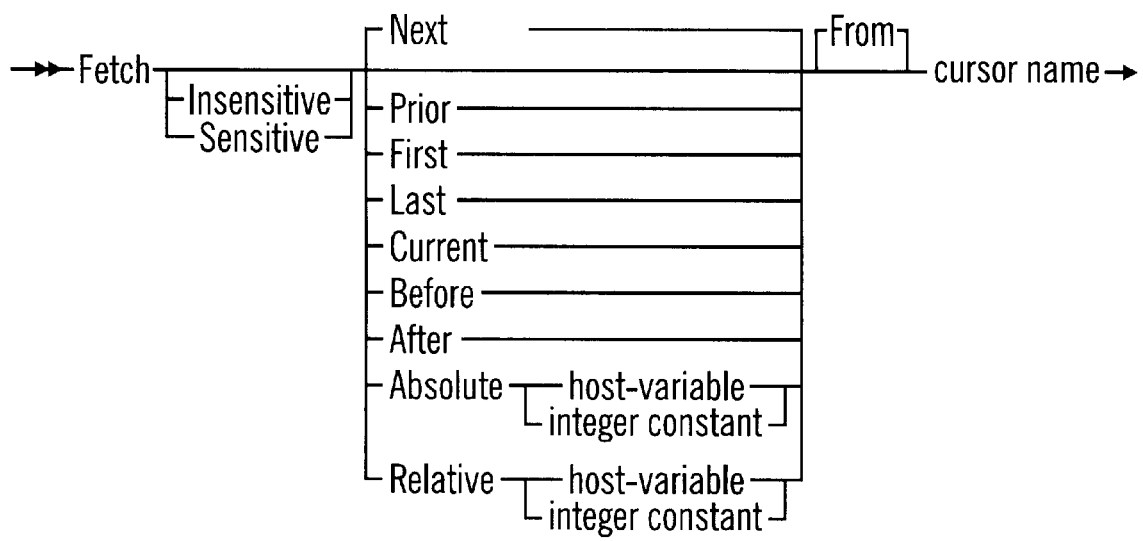
FIG. 8 illustrates the format of a FETCH cursor command in accordance with preferred embodiments of the present invention.

After the result table 50 is populated with rows from the database table according to any qualification criteria in the SELECT statement, the application 2 may issue FETCH statements to fetch rows of data from the result table or positioned UPDATE and DELETE commands to modify rows in the result table 50. FIG. 8 illustrates a format of a preferred embodiment FETCH command. An "insensitive" FETCH command returns the row from the result table 50 without accessing the corresponding row in the base table 60. However, it is possible that a previous FETCH SENSITIVE would have altered the row in the result table 50 with updates to the base table 60. Previous updates to the result table 50 would also be reflected in the row. A FETCH SENSITIVE checks the base table 60, thus reflecting changes made outside of the cursor result table 50. FETCH SENSITIVE may only be selected for cursors defined as SENSITIVE STATIC SCROLL, so that the cursor includes the configuration columns, ABS, CTL, RID, that allow checking with the base table 60. The FETCH operations include:

NEXT: positions the cursor on the next row of the result table 50 relative to the current cursor position and fetches the row. NEXT is the default.

PRIOR: positions the cursor on the previous row of the result table 50 relative to the current cursor position and fetches the row.

FIRST: positions the cursor on the first row of the result table 50 and fetches the row.

LAST: positions the cursor on the last row of the result table 50 and fetches the row.

CURRENT: fetches the current row.

BEFORE: positions the cursor before the first row of the result table 50.

AFTER: positions the cursor after the last row of the result table 50.

ABSOLUTE: Evaluates the host variable or integer constant to an integral value k, and then moves the cursor position to the kth row in the result table 50 if k>0 or to k rows from the bottom of the table if k<0.

RELATIVE: Evaluates the host variable or integer constant to an integral value k, and then moves the cursor position to row in the result table 50 k rows after the current row if k>0 or to k rows before the current row if k<0.

Figure 9:
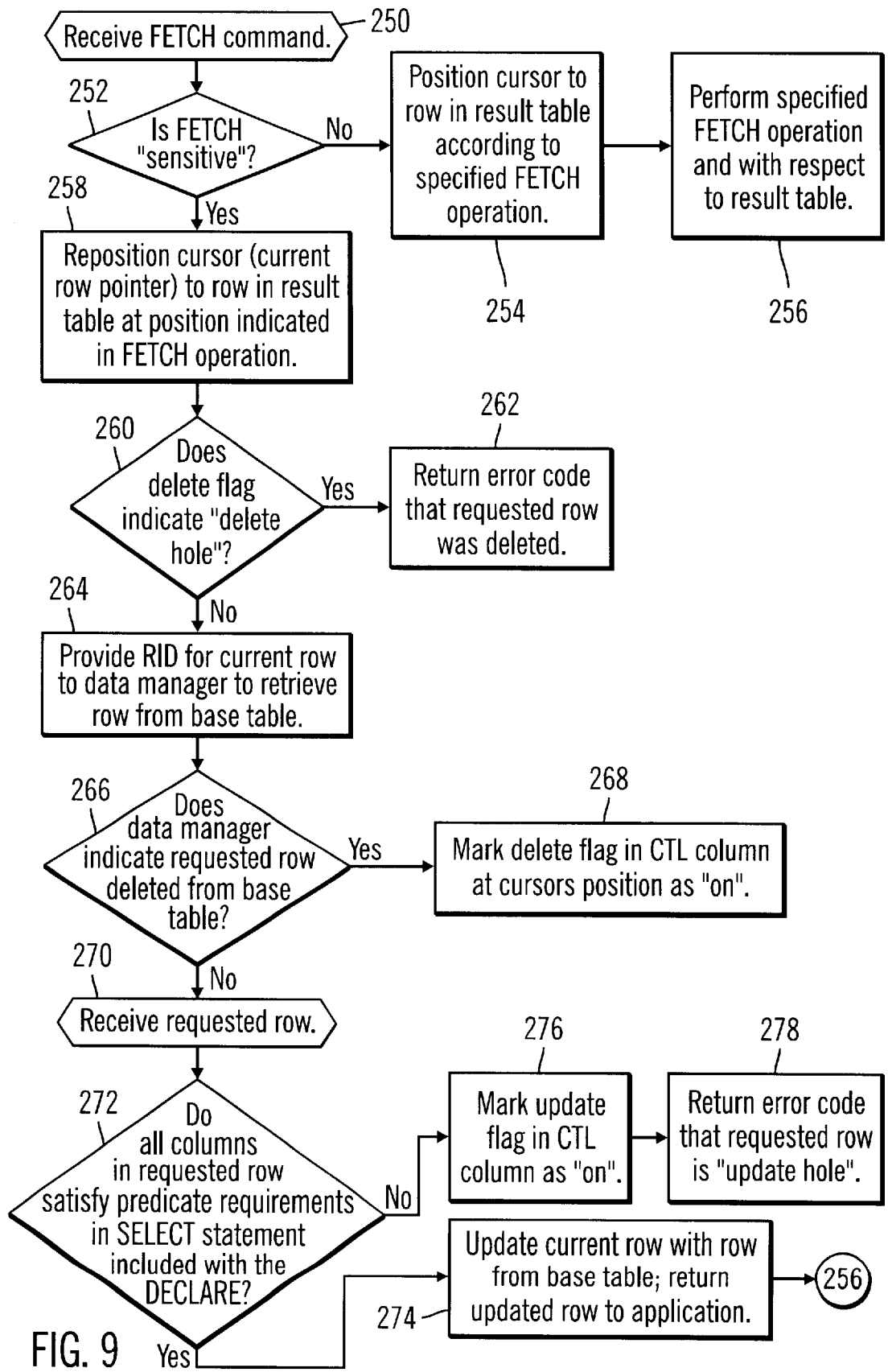
FIG. 9 illustrates logic implemented in the database program to execute a FETCH cursor command in accordance with preferred embodiments of the present invention.

FIG. 9 illustrates logic implemented in the database program 4 to return data to an application program 2 in response to a FETCH command, such as the FETCH command shown in FIG. 8. Control begins at block 250 with the executive 6 receiving the FETCH command. If (at block 252) the FETCH is "insensitive", then the database program 6 would position (at block 254) the cursor to the position specified in the FETCH operation, e.g., PRIOR, FIRST, LAST, CURRENT, etc. and then return (at block 256) the row at the new cursor position in the result table 50. If the returned row in the result table 50 was previously fetched with a FETCH SENSITIVE, it would reflect any changes made to the base table 60 prior to such FETCH SENSITIVE operation. The FETCH sensitivity that can be specified depends on the declared cursor sensitivity. If the cursor is declared as insensitive, then the FETCH can only be insensitive. However, if the cursor is declared as sensitive, then the FETCH can be declared as either sensitive or insensitive.

If the FETCH is SENSITIVE, then the data manager 16 repositions (at block 258) the cursor (current row pointer) to the row in the result table 50 according to the operation specified in the FETCH statement, e.g., next, prior, first, k rows forward or backward in a relative or absolute operation, etc. If (at block 260) the delete flag in the CTL column in the accessed row of the result table 50 indicates a "delete hole", i.e., that the row has been deleted in the base table 60, then the executive 6 returns (at block 262) an error code that the requested row was deleted. Alternatively, if a "delete hole" is detected, then the data manager 16 may return to the base table to determine whether the delete was undone by a restore or savepoint operation. Otherwise, if the requested row has not been deleted, then the runtime 14 provides (at block 264) the data manager 16 the RID for the current row, accessed from the RID column of the determined row in the result table 50. If (at block 266) the data manager 6 returns a code indicating that the row in the base table 60 identified by the presented RID has been deleted, then the delete flag in the CTL column of the determined row in the result table 50 is set (at block 268) to "on" (the runtime program 14 would instruct the data manager 16 to update the delete flag in the result table 50). Otherwise, the runtime 14 would receive (at block 270) the row identified by the RID in the base table 60 from the data manager 16.

If (at block 272) all the columns in the SELECT list in the row received from the base table 60 satisfy the predicate requirements included in the WHERE clause of the SELECT statement or if there is no WHERE predicate clause, then the database program 4 updates (at block 274) the current row in the result table 50 with the retrieved corresponding row from the base table 60 and proceeds to block 256 to return the current row in the result table 50 to the application program 2. If (at block 272) the columns in the SELECT list in the corresponding row in the base table 60 do not satisfy the predicate in the WHERE clause, then the update flag in the CTL column for the determined row in the result table 50 is set (at block 276) to "on"; indicating an "update hole", i.e., that the corresponding row in the base table 60 no longer satisfies the query. The executive 6 would then return (at block 278) an error code to the application program 2 indicating that the requested row is an "update hole", i.e., has been updated in the base table 60 to a value that no longer satisfies the WHERE predicate requirements.

Figure 10:
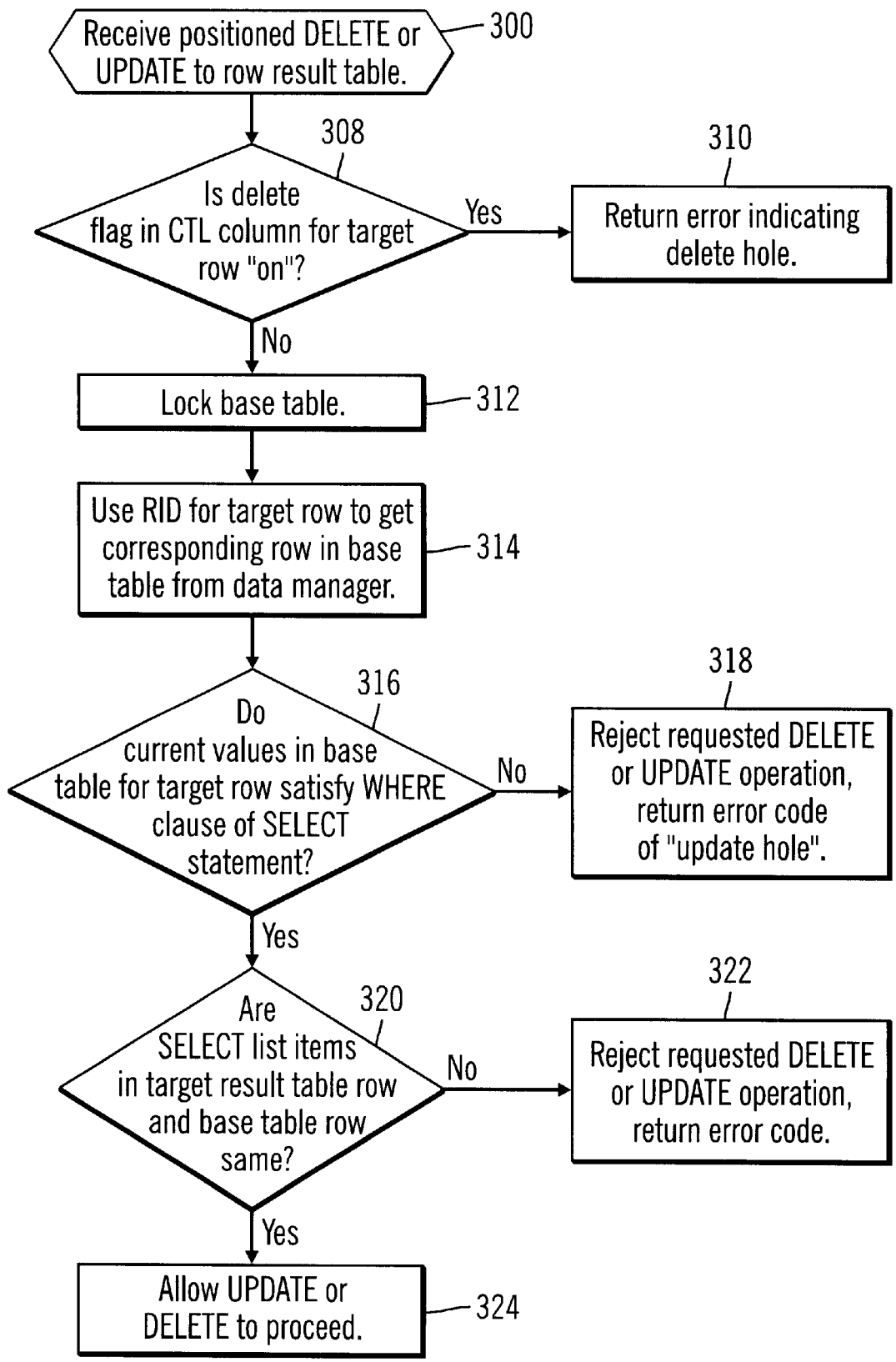
FIG. 10 illustrates logic implemented in the database program to execute an UPDATE or DELETE command to modify a row in the result table in accordance with preferred embodiments of the present invention.

FIG. 10 illustrates logic implemented in the components of the database program 4 to DELETE and UPDATE a row in the result table 50, which begins at block 300 with the executive 6 receiving a positioned DELETE or UPDATE command from the application program 2 to update or delete the row in the result table at the current position. A determination is made (at block 308) whether the delete flag in the CTL column of the current row in the result table 50 is "on", indicating that the row has been deleted. If the base table 60 row was deleted, then an error code is returned (at block 310) to the application program 2. If, for a DELETE, the delete and update flags are not "on" (from block 304), and for an UPDATE the delete flag is not "on" (from block 308), then the base table is locked (at block 312).

Once the base table is locked, the RID for the target row in the result table is used to retrieve (at block 314) the corresponding row in the base table 60 from the data manager 6. A determination is then made (at block 316) as to whether the current values in the corresponding base table 60 row satisfy the WHERE clause of the SELECT statement included with the DECLARE cursor. If not, then the database program 4 rejects (at block 318) the requested DELETE or UPDATE operation, and returns an error code indicating "update hole". Otherwise, if the current values satisfy the WHERE clause, then the database program 4 further determines (at block 320) whether the SELECT list items in the target row in the result table 50 and the corresponding row at the RID in the base table 60 are identical, i.e., whether another application has updated the corresponding row in the base table 60. If the result table 50 and base table 60 rows are not identical, then the DELETE or UPDATE operation is rejected (at block 322) and an error code of "update hole" is returned to the application program 2. This prevents an update or deletion of a record if the data in the result table that is not current. Otherwise, if the base table 60 row still satisfies the WHERE predicate clause and the select list items are the same, then the database program 4 allows (at block 324) the UPDATE or DELETE operation on the current row in the result table 50 to proceed.

With the above logic, changes to corresponding rows in the base table 60 are not immediately visible in the result table 60 until a FETCH operation occurs. For a positioned update, a sensitive FETCH is driven internally to update the result table. Further, the database program 4 may view rows in the result table 60 as holes if certain changes are made to the corresponding rows in the base table 60. Rows in the result table 50 and corresponding rows in the base table 60 may have different values. Differences between the result table 50 and base table 60 are detected when executing the FETCH SENSITIVE, UPDATE and DELETE commands. If a row is designated as an "update hole" as a result of an updated corresponding row in the base table 60 not satisfying the WHERE clause predicate, then row may later be visible, i.e., no longer have the "update hole" status, if the corresponding row in the base table 60 is subsequently updated. If a row is a "delete hole", then no further operation against that result table 50 row is possible, unless the delete is rolled back.

In the current art, cursors can fetch forward. In preferred implementations, the rows of a table, such as the result table 50, are stored in database pages. The pages are organized into segments. The pages organized in a segment hold sequential rows of the same table. The rows are sequential within a page and between adjacent pages. The rows of a database table may be maintained in multiple segments in the database storage space. A space map identifies the segments including pages in which a database table is implemented, and an order of the identified segments with respect to each other in which the sequential rows are stored. If the database program is at the end of a page including rows for a table in a segment, then the space map would indicate the next segment that would include the next series of sequential rows in the table.

Figure 11:
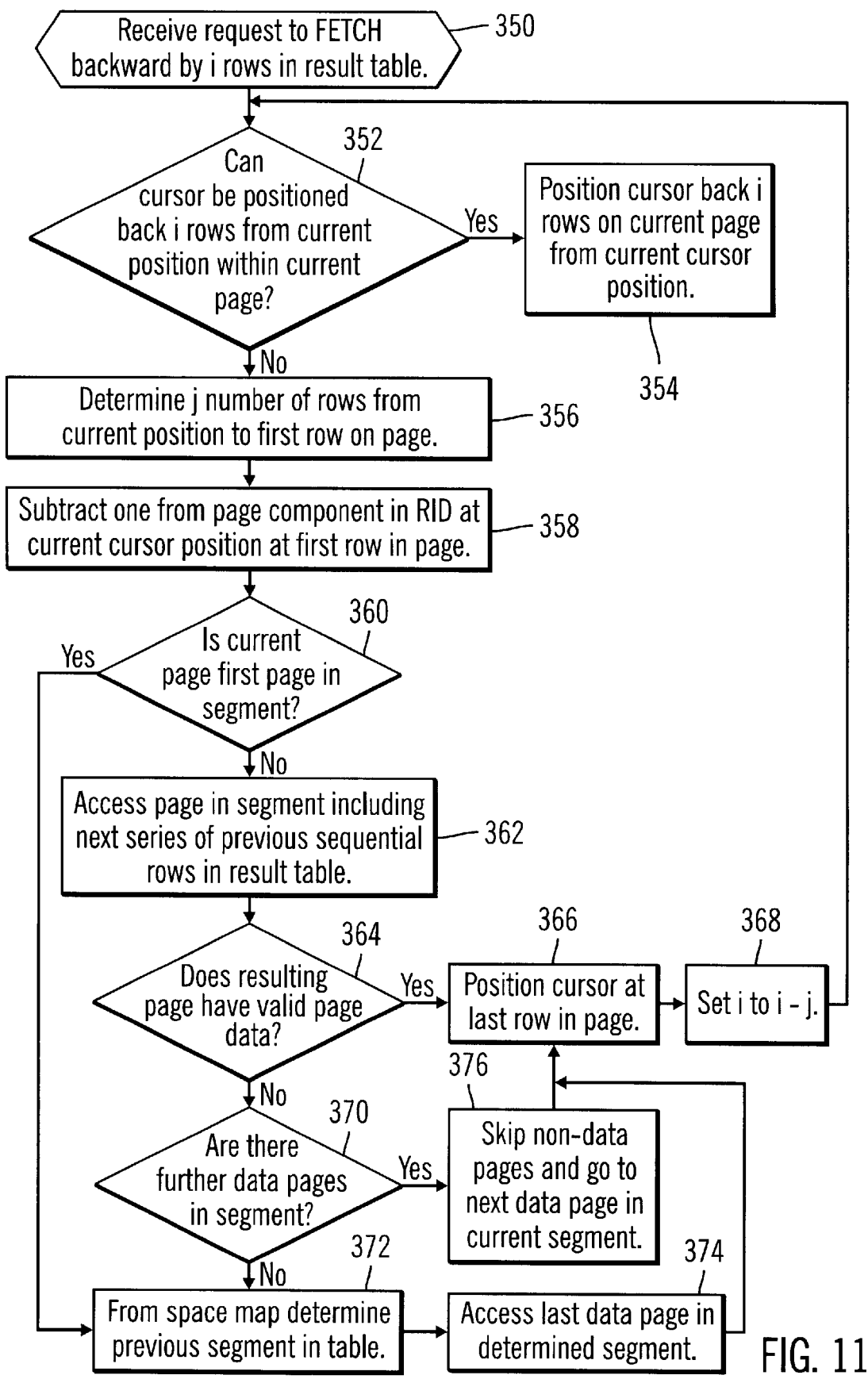
FIG. 11 illustrates logic implemented in the database program to FETCH backward from a current position in the result table in accordance with preferred embodiments of the present invention.

FIG. 11 illustrates logic implemented in the database program 4 to perform a FETCH backward operation. As discussed, a FETCH operation may FETCH backwards multiple rows in the base table from the current position on a page. Control begins at block 350 with the executive 6 receiving a request to FETCH backwards by i rows from the current row in the result table 50. If the cursor (current row pointer) can be positioned back i rows within the current page including the current position, then the database program 4 positions (at block 354) the cursor back i rows on the current page from the current cursor position. Otherwise, the database program 4 determines (at block 356) the j number of rows from the current cursor position to the first row on the page. At block 358, one is subtracted (at block 358) from the page number identifier in the RID for the current row in the result table 50, which is the current page including the cursor position. The result of the subtraction at block 358 is the page in the segment including the previous sequential rows in the result table. 50.

If (at block 360) the current page including the current row position is not the first page in the segment, then the database program 4 accesses (at block 362) the previous page including the prior series of sequential rows in the result table 50. If (at block 364) the accessed prior page is a valid data page storing rows from the result table 50, then the database program 4 positions (at block 366) the current cursor position to the last row on the accessed prior page. The database program 4 sets (at block 368) i to i minus j, which is the number of rows that the cursor must now be moved backward to reach the target row in the result table 50 of the FETCH operation. From block 364, control proceeds back to block 352 to determine how to move the current row pointer backward to reach the target result row. If (at block 364) the resulting page does not have valid page data, then the database program 4 determines (at block 370) whether there are further data pages in the segment. If so, then the database program 4 skips (at block 366) the non-data pages and proceeds to block 366 to position the cursor at the last row in the next data page in the current segment to determine how to move the cursor pointer backward from the current page.

If (at block 370) there are no further pages in the current segment from block 370 or the yes branch of block 360, then the database program 4 accesses the space map to determine (at block 372) the previous segment storing previous sequential rows in the result table 50. The database program 4 then accesses (at block 374) the last data page in the determined segment and goes back to block 366 to determine how to move the cursor backward in the current page.

In the current art, the data manager 16 will fetch a number of pages from storage that include subsequent sequential rows in a table if, using a statistical algorithm, the data manager 16 determines that the program is sequentially accessing rows in the database table. Typically, the database program uses a statistical consideration to determine whether rows are being sequentially accessed. Fetching pages into the buffer pool that include subsequent sequential pages improves performance because the data the program will sequentially access is prefetched into memory.

Preferred embodiments provide a technique for prefetching pages including the previous rows in the backward direction from the current position in the result table. The data manager 16 would utilize an algorithm to determine whether a program is sequentially fetching backward sequential rows in the result table. For instance, the data manager 16 may determine that a backward sequential access is occurring if a certain number of the last pages fetched were in backward sequential order. In such case, the data manager 16 would use the space map to determine pages in the same segment or in other segments that include prior sequential rows in the database table from the current position and instruct the buffer manager 18 to prefetch into memory such determined pages in anticipation that they will be accessed during a sequential fetch backward operation.

Figure 12:
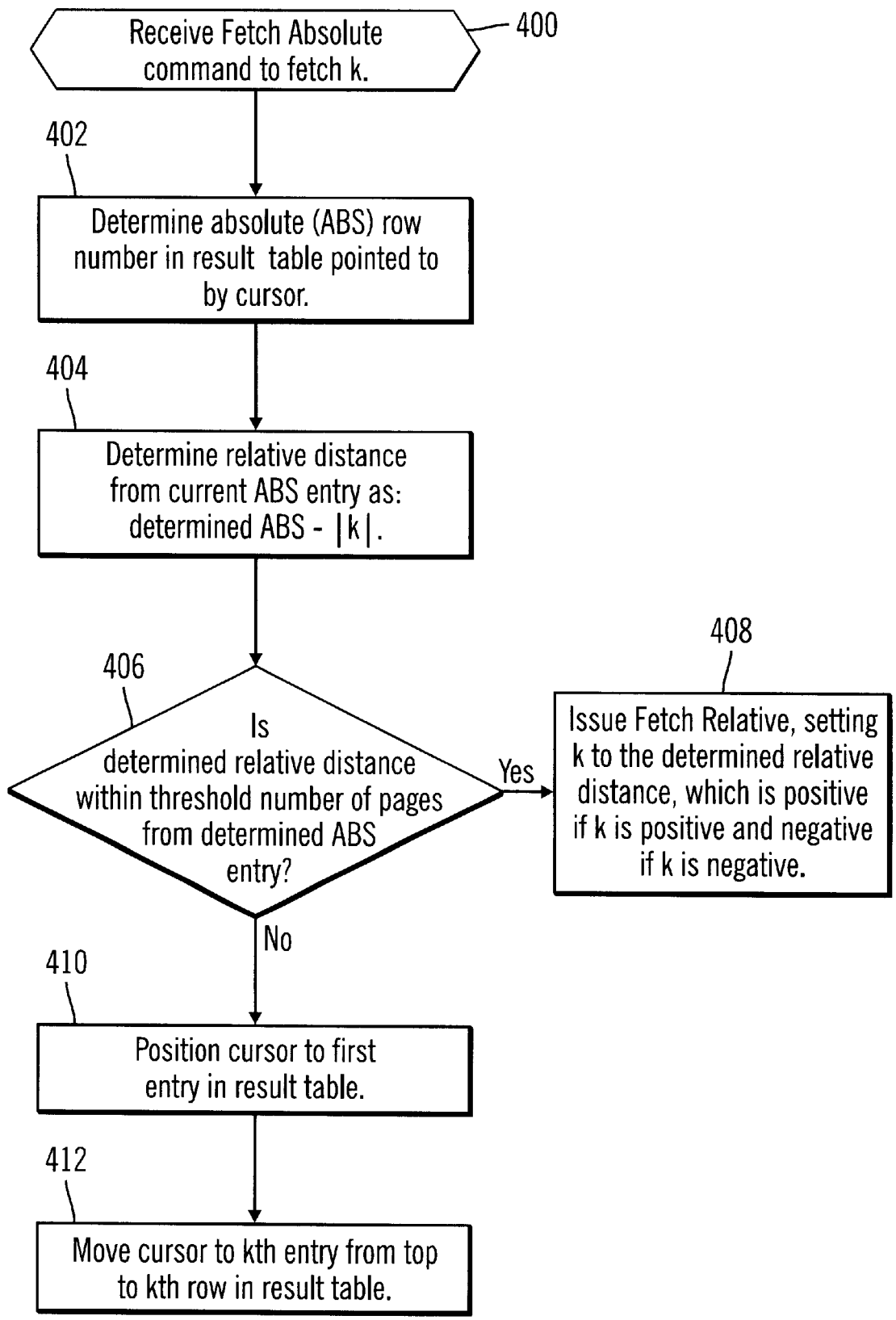
FIG. 12 illustrates logic implemented in the database program to FETCH ABSOLUTE from a current position in the result table to a kth position in the result table in accordance with preferred embodiments of the present invention.

FIG. 12 illustrates logic implemented in the database program 4 to perform a FETCH ABSOLUTE operation. As discussed, a FETCH ABSOLUTE k, where k is the number of rows to fetch forward (+k) or negative (−k) from the first entry in the result table 50. Control begins at block 400 with the executive 6 receiving a request to FETCH ABSOLUTE k from the current row in the result table 50. I preferred embodiments, the application 2 would send the FETCH command to the executive 6, to then pass off to the runtime 14 to control the data manager 16 to perform the specific database table processing operations to implement the FETCH command. The data manager 16 (at block 402) would determine the absolute (ABS) row number of the entry in the result table 50 pointed to by the cursor, and the page including this entry. The data manager 16 would then determine (at block 404) the relative distance of the requested entry from the current entry as the determined ABS minus the absolute value of k, i.e., |k|.

If (at block 406) the determined relative distance is within a distance threshold, such as a certain predetermined number of pages or entries, from the current entry, then the data manager 16 converts (at block 408) the FETCH ABSOLUTE command into a FETCH RELATIVE command having a k that is equal to the determined relative distance and that is positive if the original k included with the FETCH ABSOLUTE command was positive or negative if the original k was negative.

If the relative distance is greater than the threshold distance, then the data manager 16 executes the FETCH ABSOLUTE by positioning (at block 410) the cursor pointer to the first entry in the result table 50 and then moving the cursor downward to the kth entry from the top in the result table 50.

The preferred logic of FIG. 12 optimizes the FETCH ABSOLUTE operation by converting it into a FETCH RELATIVE if the current entry pointed to by the cursor is relatively close to the requested entry. In such case, it would likely minimize the time and number of FETCH operations to move the cursor from the current entry in a FETCH RELATIVE type operations, instead of performing a FETCH ABSOLUTE and fetching forward from the first entry in the result table 50.

As discussed if a row is a "delete hole", then no further operation against that result table 50 row are possible, unless the deleted row is rolled back. Further, as discussed with respect to block 266 in FIG. 9 the entry at a RID in the base table 60 is checked during a FETCH SENSITIVE scrollable cursor operation. If the corresponding entry in the base table 60 was deleted, then the data manager 16 will return an error code indicating that the corresponding row in the base table 60 was deleted. If the row is deleted, then the flag in the CTL column is marked as "on" to indicate to the scrollable cursor that the row in the base table for that result table 50 entry was deleted as described with respect to blocks 264–268 in FIG. 9. This above described operation requires the data manager 16 to maintain data structures to indicate which rows in the base table 60 were deleted to prevent the scrollable cursor from inadvertently accessing a base table 60 entry after the entry that previously qualified for the result table 50 was deleted.

Figure 13:
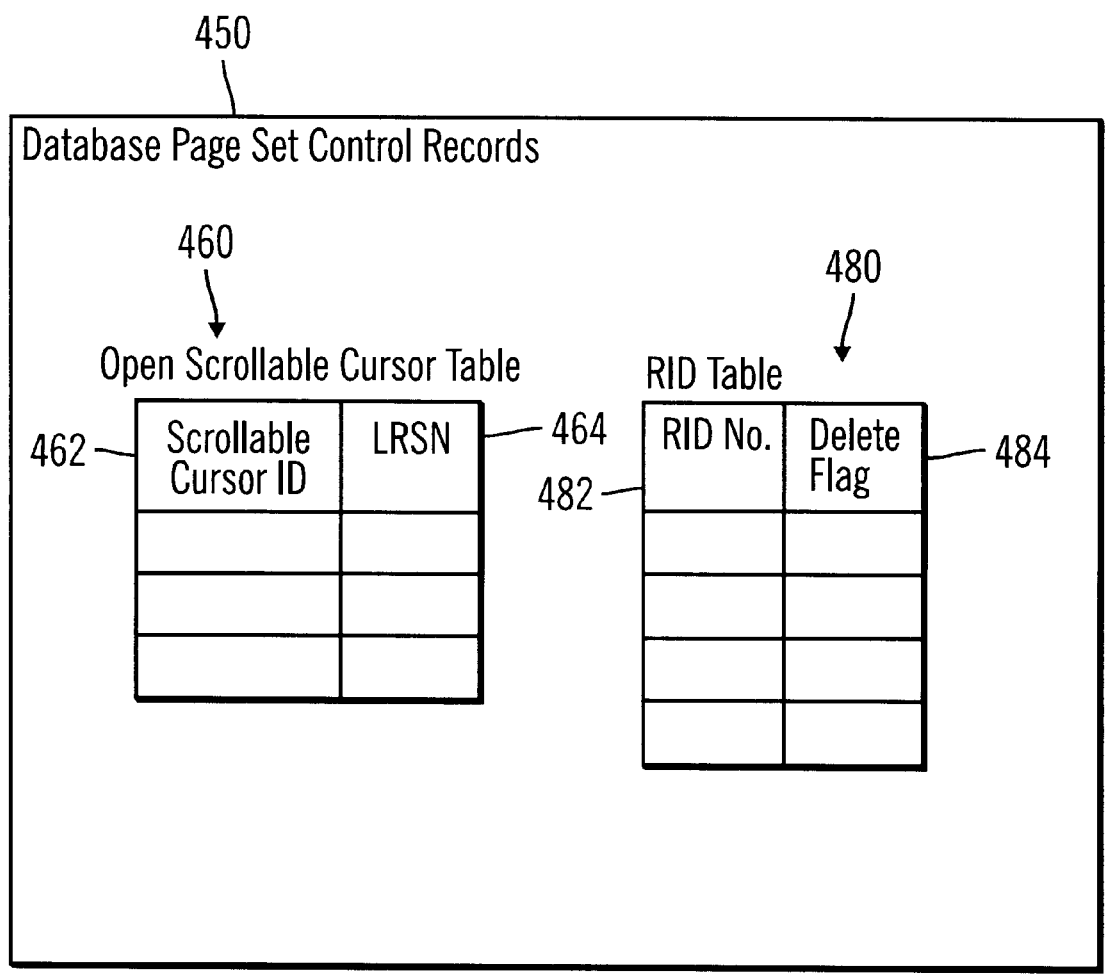
FIG. 13 illustrates a data structure used in maintaining consistency between the base table and result table for static scrollable cursors in accordance with preferred embodiments of the present invention.
Figure 14:
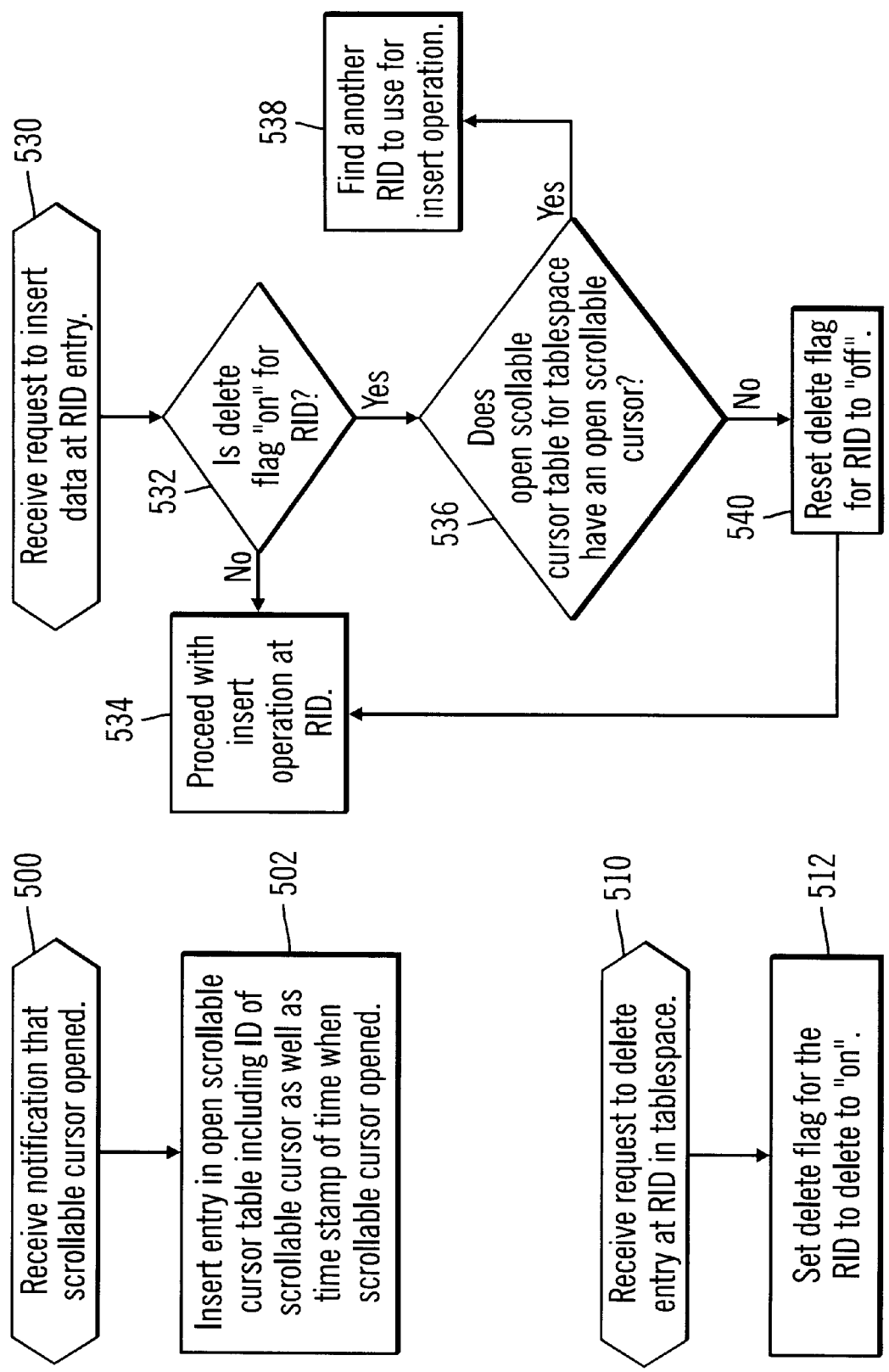
FIG. 14 illustrates logic implemented in the database program to manage the deletion of rows in the base table in accordance with preferred embodiments of the present invention.

In order to maintain accurate information on the deletion of base table rows, the database program 4 must include a procedure to ensure that another process does not insert a new entry into the RID of an entry that was previously deleted. Otherwise, a static scrollable cursor would fetch the entry, even though it has been changed and is no longer the same base table 60 entry that previously corresponded to the result table 50 entry. FIG. 13 illustrates data structures used to ensure that a scrollable cursor does not perform an operation on a result table entry corresponding to a base table entry that was deleted. Preferred embodiments are implemented in a register maintained for a table space, which in the IBM DB2 environment is known as a database page set control record. In DB2, one such page set control record is maintained for each table space.

With respect to FIG. 13, a database page set control record 450 for a table space includes an open scrollable cursor table 460 and a RID table 480. Each entry in the open scrollable cursor table 460 includes a scrollable cursor identifier field 462 that uniquely identifies the scrollable cursor in the database and a time stamp field 464, which in the described embodiments comprises a log record sequence number (LRSN) that indicates a time value at which the scrollable cursor having the scrollable cursor ID was opened. The open scrollable cursor table 462 identifies open cursors that include result table 50 entries having base table entries included in the table space for which the database page set control record 450 is maintained. Thus, a single open scrollable cursor can have entries in the open scrollable cursor table 462 in multiple database page set control records 450, for each table space having base table entries maintained in the scrollable cursor.

The RID table 480 includes entries for each RID in the table space associated with the database page set control record 450. Each entry includes a RID ID field 482 and a delete flag 484. If the delete flag 484 has an "on" value, then the entry at the RID location was deleted by an application. Otherwise, if the delete flag 484 is "off", then the entry for the RID has not been deleted.

FIG. 13 illustrates logic implemented in the database program 4 to utilize the database page set control records 450 to prevent another application from inserting an entry at a RID location whose entry was previously deleted while a scrollable cursor is opened. This logic ensures that a new entry will not be inserted in a RID location where the entry was previously deleted. In this way, the scrollable cursor is prevented from using the new inserted entry at the RID having an entry previously deleted. Without this logic, the scrollable cursor would not be aware that an entry in the base table 60 that corresponded to a result table 50 entry was deleted if a new entry is inserted at the RID location before the scrollable cursor has a chance to notice that the base table entry was deleted at the RID location. If an entry in the base table 60 is deleted, then that RID location in the base table 60 should no longer provide an entry to the result table 50, even if a new entry is inserted at the RID location.

With respect to FIG. 13, when the executive component 6 processes an OPEN cursor command for a static scrollable cursor, the executive 6 transfers the command to the runtime 14 to direct (at block 502) the data manager 16 to insert an entry in the open scrollable cursor table 460 including the ID of the opened scrollable cursor in field 462 and a time stamp when the cursor was opened in field 464. Upon receiving a request from an application to delete an entry at a RID in a tablespace (at block 510), the runtime 14 would instruct the data manager 16 to set a delete flag 484 for the RID to "on", indicating that the entry in that RID was deleted.

Upon receiving a request to insert data at a RID entry (at block 530), the runtime 14 would instruct the data manager 16 to determine (at bock 532) whether the delete flag 484 for that RID in the RID table 480 is "on". If not, then the runtime 14 directs (at block 534) the data manager 16 to proceed with the insert operation with respect to the RID having the delete flag "off". Otherwise, if the delete flag 484 for the RID is "on", then the runtime 14 directs the data manager 16 to determine (at block 536) whether the open scrollable cursor table 460 for the tablespace including the RID indicates that a scrollable cursor is open. If a cursor is open, then the executive 6 notifies (at block 538) the application to find another RID to use for the insert operation, as this RID includes an entry that was deleted and is included in a tablespace having an open a scrollable cursor. Otherwise, if the open scrollable cursor table 460 does not list any open cursors, then the runtime 14 directs (at block 540) the data manager 16 to set the delete flag 484 for that RID number 482 to "off", and control proceeds to block 534 to continue with the insert operation. Thus, in the event that a determination is made that a delete flag is "on" even though all scrollable cursors have closed for that tablespace, then that RID is made available by turning the delete flag "off" as the RID is no longer used in an active result table 50 because there are no open scrollable cursors. In preferred embodiments, insert, update and delete operations may reset the RID delete flag 484 if there are no longer any open scrollable cursors for the tablespace including the RID.

Alternative Embodiments and Conclusions

This concludes the description of the preferred embodiments of the invention. The following describes some alternative embodiments for accomplishing the present invention.

The preferred embodiments may be implemented as a method, apparatus or program using standard programming and/or engineering techniques to produce software, firmware, hardware, or any combination thereof. The programs and code defining the functions of the preferred embodiment can be delivered to a computer via a variety of information bearing media, which include, but are not limited to, computer-readable devices, firmware, programmable logic, memory devices (e.g., EEPROMs, ROMs, PROMs, RAMs, SRAMs, etc.) "floppy disk," CD-ROM, a file server providing access to the programs via a network transmission line, wireless transmission media, signals propagating through space, radio waves, infrared signals, etc. Still further the code in which the preferred embodiments are implemented may comprise hardware or electronic devices including logic to process data. Of course, those skilled in the art will recognize that many modifications may be made to this configuration without departing from the scope of the present invention.

The preferred logic of FIGS. 6, 7, 9, 10, and 11 describe specific operations occurring in a particular order. In alternative embodiments, certain of the logic operations may be performed in a different order, modified or removed and still implement preferred embodiments of the present invention. Morever, steps may be added to the above described logic and still conform to the preferred embodiments. Further, operations described herein may occur sequentially or certain operations may be processed in parallel.

In preferred embodiments, FIG. 1 described a particular relationship of database components to interpret the cursor commands and perform the requested operation with respect to the result and base tables. In alternative embodiments, different database program structures may be utilized or different components may be used to perform operations described herein as performed by a certain component. In other words, the preferred embodiment cursor result table and logic for executing cursor related statements may be implemented in different database program architectures.

The result table was described as having particular configuration columns and control blocks. In alternative embodiments, configuration data for the result table may be maintained outside of the actual result table and the control blocks defining the result table may have a format different than that described herein.

In preferred embodiments, the result table for a DECLARE statement is stored in a single result table. In further embodiments, the result table resulting from a DECLARE statement, including the SELECT substatement, may be maintained in multiple component result tables.

In preferred embodiments, the result table for updateable and scrollable cursors comprised a standard database table. In alternative embodiments, alternative data and file structures other than a database table may be used to implement the result table.

In preferred embodiments the described result table was designed for use with a static scrollable cursor. In further embodiments, the result table data structure, including control data and control blocks, may be used for cursors other than scrollable static cursors.

In summary, the present invention provides a system, method, program, and data structures for making data available to an application program. A result table is generated including rows corresponding to a subset of rows in a base table having data in one or more columns that satisfy a query predicate clause. The result table includes, for each row, a location identifier of the corresponding row in the base table and a column for each column in a query select list. The result table is accessed to return requested data from the base table to the application program.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for making data available to an application program, comprising:

generating a result table including rows corresponding to a subset of rows in a base table having data in one or more columns that satisfy a query predicate clause, wherein the result table includes, for each row, a location identifier identifying the corresponding row in the base table and a column for each column in a query select list;

receiving a fetch request to fetch a specified row in the result table;

determining whether to use the location identifier for the specified row to return data to the fetch request;

if the location identifier is determined to be used, then using the location identifier to access the row in the base table corresponding to the specified row in the result table to return requested data from the corresponding row in the base table to the fetch request; and if the location identifier is determined to not be used, then returning data from the specified row in the result table to the fetch request.

2. The method of claim 1, wherein the query select list is provided from a structured language query (SQL) SELECT statement and the query predicate clause is provided from an SQL WHERE statement.

3. The method of claim 1, wherein generating the result table further comprises generating, for each row, a delete flag indicating whether the corresponding row in the base table was deleted.

4. The method of claim 1, wherein generating the result table further comprises generating, for each row, an update flag indicating whether the corresponding row in the base table no longer qualifies according to the query predicate clause as a result of an update to the data in the row in the base table.

5. The method of claim 1, wherein the result table comprises a database table.

6. The method of claim 1, wherein generating the result table further comprises generating a column in the result table for each expression in the query select list comprising a mathematical operation performed with respect to one or more base table columns.

7. The method of claim 6, wherein generating the result table further comprises generating a column in the result table for each column included in an expression operation not included in the query select list, whereby the generated column includes values used in the expression operation.

8. The method of claim 1, wherein generating the result table further comprises generating:

a first control block for the column in the result table including the location identifier of the corresponding row in the base table, wherein the first control block indicates that the location identifier column is not involved in a compare operation when accessing data in the result table and that the column does not include data corresponding to data in a column in the corresponding row in the base table; and an additional control block for each base table column in the query select list indicating that the column is involved in the compare operation when accessing data in the result table and the corresponding column number in the base table; and further comprising using the control blocks to construct the result table.

9. The method of claim 8, wherein generating the result table further comprises generating for each column in the result table:

an additional control block for each expression in the query select list that comprises an operation performed with respect to one or more columns in the base table indicating that the column is involved in a compare operation when accessing data in the result table and that the column does not directly correspond to one column in the base table.

10. The method of claim 1, further comprising generating a database INSERT command to insert data from columns in base table rows that satisfy the query predicate clause into corresponding columns in result table rows.

11. The method of claim 10, wherein generating the database INSERT command further comprises:

generating an insert list including an entry for each column in the query select list;

generating an insert statement to insert data from the base table columns listed in the query select list into the corresponding result table columns in the insert list;

generating the query predicate clause into the insert statement; and executing the insert statement to insert data from the base table columns in the query select list into the corresponding result table columns in the insert list, wherein data is inserted from those base table rows having data that satisfies the query predicate clause in the insert statement.

12. The method of claim 10, wherein generating the database INSERT command further comprises:

generating a code into the insert statement to cause a return of the location identifier of the base table row when inserting base table rows into the result table, wherein the returned location identifier is inserted in the location identifier column in the result table.

13. The method of claim 11, wherein the code comprises including an entry for column zero in the insert list.

14. The method of claim 10, wherein generating the database INSERT command further comprises:

generating a code into the insert statement to generate a number indicating an order of an entry in the result table.

15. The method of claim 10, wherein the INSERT command is generated in response to an OPEN cursor command to open a scrollable static cursor.

16. The method of claim 1, wherein the location identifier identifies a page location including the record and a unique identifier of the record in the page.

17. The method of claim 1, wherein the result table is accessed by a static scrollable cursor, wherein updates to rows in the result table are reflected in the corresponding base table rows and wherein updates to the base table rows are considered when accessing the result table and reflected in the result table.

18. A system for making data available to an application program, comprising:

means for generating a result table including rows corresponding to a subset of rows in a base table having data in one or more columns that satisfy a query predicate clause, wherein the result table includes, for each row, a location identifier identifying the corresponding row in the base table and a column for each column in a query select list;

means for receiving a fetch request to fetch a specified row in the result table;

means for determining whether to use the location identifier for the specified row to return data to the fetch request;

means for using, if the location identifier is determined to be used, the location identifier to access the row in the base table corresponding to the specified row in the result table to return requested data from the corresponding row in the base table to the fetch request; and means for returning, if the location identifier is determined to not be used, data from the specified row in the result table to the fetch request.

19. The system of claim 18, wherein the query select list is provided from a structured language query (SQL) SELECT statement and the query predicate clause is provided from an SQL WHERE statement.

20. The system of claim 18, wherein the means for generating the result table further comprises means for generating, for each row, a delete flag indicating whether the corresponding row in the base table was deleted.

21. The system of claim 18, wherein the means for generating the result table further comprises means for generating, for each row, an update flag indicating whether the corresponding row in the base table no longer qualifies according to the query predicate clause as a result of an update to the data in the row in the base table.

22. The system of claim 18, wherein the result table comprises a database table.

23. The system of claim 18, wherein the means for generating the result table further comprises means for generating a column in the result table for each expression in the query select list comprising a mathematical operation performed with respect to one or more base table columns.

24. The system of claim 23, wherein the means for generating the result table further comprises means for generating a column in the result table for each column included in an expression operation not included in the query select list, whereby the generated column includes values used in the expression operation.

25. The system of claim 18, wherein the means for generating the result table further comprises means for generating:
    a first control block for the column in the result table including the location identifier of the corresponding row in the base table, wherein the first control block indicates that the location identifier column is not involved in a compare operation when accessing data in the result table and that the column does not include data corresponding to data in a column in the corresponding row in the base table; and
    an additional control block for each base table column in the query select list indicating that the column is involved in the compare operation when accessing data in the result table and the corresponding column number in the base table; and
    further comprising using the control blocks to construct the result table.

26. The system of claim 25, wherein the means for generating the result table further comprises means for generating for each column in the result table:
    an additional control block for each expression in the query select list that comprises an operation performed with respect to one or more columns in the base table indicating that the column is involved in a compare operation when accessing data in the result table and that the column does not directly correspond to one column in the base table.

27. The system of claim 18, further comprising means for generating a database INSERT command to insert data from columns in base table rows that satisfy the query predicate clause into corresponding columns in result table rows.

28. The system of claim 27, wherein the means for generating the database INSERT command further comprises:
    means for generating an insert list including an entry for each column in the query select list;
    means for generating an insert statement to insert data from the base table columns listed in the query select list into the corresponding result table columns in the insert list;
    means for generating the query predicate clause into the insert statement; and
    means for executing the insert statement to insert data from the base table columns in the query select list into the corresponding result table columns in the insert list, wherein data is inserted from those base table rows having data that satisfies the query predicate clause in the insert statement.

29. The system of claim 27, wherein the means for generating the database INSERT command further comprises:
    means for generating a code into the insert statement to cause a return of the location identifier of the base table row when inserting base table rows into the result table, wherein the returned location identifier is inserted in the location identifier column in the result table.

30. The system of claim 29, wherein the code comprises including an entry for column zero in the insert list.

31. The system of claim 27, wherein the INSERT command is generated in response to an OPEN cursor command to open a scrollable static cursor.

32. The system of claim 27, wherein the means for generating the database INSERT command further comprises:
    generating a code into the insert statement to generate a number indicating an order of an entry in the result table.

33. The system of claim 18, wherein the location identifier identifies a page location including the record and a unique identifier of the record in the page.

34. The system of claim 18, wherein the result table is accessed by a static scrollable cursor, wherein updates to rows in the result table are reflected in the corresponding base table rows and wherein updates to the base table rows are considered when accessing the result table and reflected in the result table.

35. A program for making data available to an application program, wherein the program comprises code embedded in a computer readable medium capable of causing a computer to perform:
    generating a result table including rows corresponding to a subset of rows in a base table having data in one or more columns that satisfy a query predicate clause wherein the result table includes, for each row, a location identifier identifying the corresponding row in the base table and a column for each column in a query select list;
    receiving a fetch request to fetch a specified row in the result table;
    determining whether to use the location identifier for the specified row to return data to the fetch request;
    if the location identifier is determined to be used, then using the location identifier to access the row in the base table corresponding to the specified row in the result table to return requested data from the corresponding row in the base table to the fetch request; and
    if the location identifier is determined to not be used, then returning data from the specified row in the result table to the fetch request.

36. The program of claim 35, wherein the query select list is provided from a structured language query (SQL) SELECT statement and the query predicate clause is provided from an SQL WHERE statement.

37. The program of claim 35, wherein generating the result table further comprises generating, for each row, a delete flag indicating whether the corresponding row in the base table was deleted.

38. The program of claim 35, wherein generating the result table further comprises generating, for each row, an update flag indicating whether the corresponding row in the base table no longer qualifies according to the query predicate clause as a result of an update to the data in the row in the base table.

39. The program of claim 35, wherein the result table comprises a database table.

40. The program of claim 35, wherein generating the result table further comprises generating a column in the result table for each expression in the query select list comprising a mathematical operation performed with respect to one or more base table columns.

41. The program of claim 40, wherein generating the result table further comprises generating a column in the result table for each column included in an expression operation not included in the query select list, whereby the generated column includes values used in the expression operation.

42. The program of claim 35, wherein generating the result table further comprises generating:

a first control block for the column in the result table including the location identifier of the corresponding row in the base table, wherein the first control block indicates that the location identifier column is not involved in a compare operation when accessing data in the result table and that the column does not include data corresponding to data in a column in the corresponding row in the base table; and an additional control block for each base table column in the query select list indicating that the column is involved in the compare operation when accessing data in the result table and the corresponding column number in the base table; and further comprising using the control blocks to construct the result table.

43. The program of claim 42, wherein generating the result table further comprises generating for each column in the result table:

an additional control block for each expression in the query select list that comprises an operation performed with respect to one or more columns in the base table indicating that the column is involved in a compare operation when accessing data in the result table and that the column does not directly correspond to one column in the base table.

44. The program of claim 42, further comprising generating a database INSERT command to insert data from columns in base table rows that satisfy the query predicate clause into corresponding columns in result table rows.

45. The program of claim 44, wherein generating the database INSERT command further comprises:

generating an insert list including an entry for each column in the query select list;

generating an insert statement to insert data from the base table columns listed in the query select list into the corresponding result table columns in the insert list;

generating the query predicate clause into the insert statement; and executing the insert statement to insert data from the base table columns in the query select list into the corresponding result table columns in the insert list, wherein data is inserted from those base table rows having data that satisfies the query predicate clause in the insert statement.

46. The program of claim 44, wherein generating the database INSERT command further comprises:

generating a code into the insert statement to cause a return of the location identifier of the base table row when inserting base table rows into the result table, wherein the returned location identifier is inserted in the location identifier column in the result table.

47. The program of claim 45, wherein the code comprises including an entry for column zero in the insert list.

48. The program of claim 44, wherein generating the database INSERT command further comprises:

generating a code into the insert statement to generate a number indicating an order of an entry in the result table.

49. The program of claim 44, wherein the INSERT command is generated in response to an OPEN cursor command to open a scrollable static cursor.

50. The program of claim 42, wherein the location identifier identifies a page location including the record and a unique identifier of the record in the page.

51. The program of claim 42, wherein the result table is accessed by a static scrollable cursor, wherein updates to rows in the result table are reflected in the corresponding base table rows and wherein updates to the base table rows are considered when accessing the result table and reflected in the result table.

52. A computer readable medium accessible to a computer database program, comprising:

a base database table; and a result table including rows corresponding to a subset of rows in the base table having data in one or more columns that satisfy a query predicate clause, wherein the result table includes, for each row, a location identifier identifying the corresponding row in the base table and a column for each column in a query select list, wherein, in response to a fetch request, if the location identifier is determined to be used, then the location identifier is used to access the row in the base table corresponding to the specified row in the result table to return requested data from the base table to the fetch request or if the location identifier is determined to not be used, then data is returned from the specified row in the result table to the fetch request.

53. The computer readable medium of claim 52, wherein the result table further includes, for each row, a delete flag indicating whether the corresponding row in the base table was deleted.

54. The computer readable medium of claim 52, wherein the result table further includes, for each row, an update flag indicating whether the corresponding row in the base table no longer qualifies according to the query predicate clause as a result of an update to the data in the row in the base table.

55. The computer readable medium of claim 52, wherein the result table comprises a database table.

56. The computer readable medium of claim 52, wherein the result table further includes a column for each expression in the query select list comprising a mathematical operation performed with respect to one or more base table columns.

57. The computer readable medium of claim 56, wherein the result table further comprises a column for each column included in an expression operation not included in the query select list, whereby the generated column includes values used in the expression operation.

58. The computer readable medium of claim 52, further comprising:

a first control block for the column in the result table including the location identifier of the corresponding row in the base table, wherein the first control block indicates that the location identifier column is not involved in a compare operation when accessing data in the result table and that the column does not include data corresponding to data in a column in the corresponding row in the base table; and an additional control block for each base table column in the query select list indicating that the column is involved in the compare operation when accessing data in the result table and the corresponding column number in the base table, wherein the control blocks are used to construct the result table.

59. The computer readable medium of claim 58, further comprising:

an additional control block for each expression in the query select list that comprises an operation performed with respect to one or more columns in the base table indicating that the column is involved in a compare operation when accessing data in the result table and that the column does not directly correspond to one column in the base table.

60. The computer readable medium of claim 52, wherein the location identifier identifies a page location including the record and a unique identifier of the record in the page.

61. The method of claim 1, wherein the location identifier is used to return data from the corresponding row in the base table if the fetch request indicates fetch sensitive and wherein the data is returned from the specified row in the result table if the fetch request indicates fetch insensitive.

62. The method of claim 1, wherein the result table is generated in response to a scrollable cursor database command.

63. The method of claim 1, wherein the location identifier is used to return data from the corresponding row in the base table if the fetch request indicates to return data including changes to the corresponding row in the base table and wherein the data is returned from the specified row in the result table if the fetch request indicates to return data that does not include changes to the corresponding row from the base table.

64. A method for making data available to an application program, comprising:

generating a result table in response to a database scrollable cursor command including rows corresponding to a subset of rows in a base table having data in one or more columns that satisfy a query predicate clause, wherein the result table includes, for each row, a location identifier identifying the corresponding row in the base table and a column for each column in a query select list;

receiving a fetch request to fetch a specified row in the result table, wherein the fetch requests indicates to fetch sensitive or insensitive;

if the fetch request indicates to fetch sensitive, then using the location identifier to access the row in the base table corresponding to the specified row in the result table to return requested data from the corresponding row in the base table to the fetch request; and if the fetch requests indicates to fetch insensitive, then returning data from the specified row in the result table to the fetch request.

65. The system of claim 18, wherein the location identifier is used to return data from the corresponding row in the base table if the fetch request indicates fetch sensitive and wherein the data is returned from the specified row in the result table if the fetch request indicates fetch insensitive.

66. The system of claim 18, wherein the result table is generated in response to a scrollable cursor database command.

67. The system of claim 18, wherein the location identifier is used to return data from the corresponding row in the base table if the fetch request indicates to return data including changes to the corresponding row in the base table and wherein the data is returned from the specified row in the result table if the fetch request indicates to return data that does not include changes to the corresponding row from the base table.

68. A system for making data available to an application program, comprising:

means for generating a result table in response to a database scrollable cursor command including rows corresponding to a subset of rows in a base table having data in one or more columns that satisfy a query predicate clause, wherein the result table includes, for each row, a location identifier identifying the corresponding row in the base table and a column for each column in a query select list;

means for receiving a fetch request to fetch a specified row in the result table, wherein the fetch requests indicates to fetch sensitive or insensitive;

means for using, if the fetch request indicates to fetch sensitive, the location identifier to access the row in the base table corresponding to the specified row in the result table to return requested data from the corresponding row in the base table to the fetch request; and means for returning data, if the fetch requests indicates to fetch insensitive, data from the specified row in the result table to the fetch request.

69. The program of claim 35, wherein the location identifier is used to return data from the corresponding row in the base table if the fetch request indicates fetch sensitive and wherein the data is returned from the specified row in the result table if the fetch request indicates fetch insensitive.

70. The program of claim 35, wherein the result table is generated in response to a scrollable cursor database command.

71. The program of claim 35, wherein the location identifier is used to return data from the corresponding row in the base table if the fetch request indicates to return data including changes to the corresponding row in the base table and wherein the data is returned from the specified row in the result table if the fetch request indicates to return data that does not include changes to the corresponding row from the base table.

72. A program for making data available to an application program, wherein the program comprises code embedded in a computer readable medium capable of causing a computer to perform:

generating a result table in response to a database scrollable cursor command including rows corresponding to a subset of rows in a base table having data in one or more columns that satisfy a query predicate clause, wherein the result table includes, for each row, a location identifier identifying the corresponding row in the base table and a column for each column in a query select list;

receiving a fetch request to fetch a specified row in the result table, wherein the fetch requests indicates to fetch sensitive or insensitive;

if the fetch request indicates to fetch sensitive, then using the location identifier to access the row in the base table corresponding to the specified row in the result table to return requested data from the corresponding row in the base table to the fetch request; and if the fetch requests indicates to fetch insensitive, then returning data from the specified row in the result table to the fetch request.

73. The computer readable medium of claim 52, wherein the location identifier is used to return data from the corresponding row in the base table if the fetch request indicates fetch sensitive and wherein the data is returned from the specified row in the result table if the fetch request indicates fetch insensitive.

74. The computer readable medium of claim 52, wherein the result table is generated in response to a scrollable cursor database command.

75. The computer readable medium of claim 52, wherein the location identifier is used to return data from the corresponding row in the base table if the fetch request indicates to return data including changes to the corresponding row in the base table and wherein the data is returned from the specified row in the result table if the fetch request indicates to return data that does not include changes to the corresponding row from the base table.

* * * * *

UNITED STATES PATENT AND TRADEMARK OFFICE
CERTIFICATE OF CORRECTION

PATENT NO. : 6,598,041 B1
DATED : July 22, 2003
INVENTOR(S) : Margaret Ann Bernal et al.

It is certified that error appears in the above-identified patent and that said Letters Patent is hereby corrected as shown below:

<u>Title page,</u>
Item [54], Title, remove "PROCESSING MODIFICATIONS TO DATA IN TABLES IN A DATABASE SYSTEM" insert -- METHOD, SYSTEM, AND PROGRAM FOR IMPLEMENTING SCROLLABLE CURSORS IN A DATABASE. --

Signed and Sealed this

Ninth Day of March, 2004

JON W. DUDAS
*Acting Director of the United States Patent and Trademark Office*